(12) United States Patent
Greenidge et al.

(10) Patent No.: US 12,362,823 B2
(45) Date of Patent: *Jul. 15, 2025

(54) FRACTIONATED SATELLITE CONSTELLATION

(71) Applicant: Viasat Inc., Carlsbad, CA (US)

(72) Inventors: David D. Greenidge, Longmont, CO (US); Craig A. Miller, Carlsbad, CA (US)

(73) Assignee: Viasat, Inc., Carlsbad, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 18/184,031

(22) Filed: Mar. 15, 2023

(65) Prior Publication Data

US 2023/0231624 A1 Jul. 20, 2023

Related U.S. Application Data

(63) Continuation of application No. 17/294,289, filed as application No. PCT/US2019/062183 on Nov. 19, 2019, now Pat. No. 11,637,628.

(60) Provisional application No. 62/769,168, filed on Nov. 19, 2018.

(51) Int. Cl.
H04B 7/185 (2006.01)

(52) U.S. Cl.
CPC ....... *H04B 7/18521* (2013.01); *H04B 7/1851* (2013.01); *H04B 7/18519* (2013.01); *H04B 7/18584* (2013.01)

(58) Field of Classification Search
None
See application file for complete search history.

(56) References Cited

U.S. PATENT DOCUMENTS

| | | | |
|---|---|---|---|
| 4,691,882 A | 9/1987 | Young | |
| 4,985,706 A | 1/1991 | Schukat | |
| 5,722,042 A | 2/1998 | Kimura et al. | |

(Continued)

FOREIGN PATENT DOCUMENTS

| | | | |
|---|---|---|---|
| CN | 103415083 A | 11/2013 | |
| CN | 104601363 A | 5/2015 | |

(Continued)

*Primary Examiner* — Scott M Sciacca
(74) *Attorney, Agent, or Firm* — Holland & Hart LLP

(57) ABSTRACT

Systems and method for supporting a fractionated satellite constellation are disclosed. A gateway satellite may route communications to and from auxiliary satellites using a first communication protocol. The auxiliary satellites may be orbitally-coupled with the gateway satellite and may be equipped with respective payload types that provide respective functionalities. The auxiliary satellites may also use respective communications protocols that are different than one another and the first communication protocol. Routing communications to and from auxiliary satellites may include relaying a communication between multiple auxiliary satellites. Routing communications between auxiliary satellites may include relaying a communication between multiple gateway satellites. Routing communications to and from auxiliary satellites may also include relaying communications between commercial satellites and auxiliary satellites.

33 Claims, 16 Drawing Sheets

(56) References Cited

U.S. PATENT DOCUMENTS

| | | |
|---|---|---|
| 5,887,257 A | 3/1999 | Olds |
| 6,023,605 A | 2/2000 | Sasaki et al. |
| 6,556,828 B1 | 4/2003 | Carlin et al. |
| 6,684,056 B1 | 1/2004 | Emmons, Jr. et al. |
| 6,816,682 B1 | 11/2004 | Lonov et al. |
| 6,850,497 B1 | 2/2005 | Sigler et al. |
| 6,985,454 B1 | 1/2006 | Wiedeman et al. |
| 8,918,047 B1 * | 12/2014 | Teller ............ H04B 7/18513 455/427 |
| 9,647,749 B2 | 5/2017 | Krebs |
| 9,973,266 B1 | 5/2018 | Avellan et al. |
| 2004/0192197 A1 | 9/2004 | Capots |
| 2005/0288011 A1 | 12/2005 | Dutta |
| 2007/0186251 A1 | 8/2007 | Horowitz et al. |
| 2008/0099625 A1 | 5/2008 | Yocom |
| 2010/0265879 A1 | 10/2010 | Foxworthy et al. |
| 2012/0018585 A1 | 1/2012 | Liu et al. |
| 2014/0341586 A1 | 11/2014 | Wyler |
| 2015/0131523 A1 | 5/2015 | Balter et al. |
| 2018/0019807 A1 * | 1/2018 | Hreha ............ H04B 7/18521 |
| 2018/0022474 A1 | 1/2018 | Meek |
| 2018/0227272 A1 | 8/2018 | Zaruba |
| 2019/0181946 A1 | 6/2019 | Wendling |

FOREIGN PATENT DOCUMENTS

| | | |
|---|---|---|
| CN | 105306128 A | 2/2016 |
| EP | 1148661 A2 | 10/2001 |
| JP | 6243229 A | 9/1994 |
| JP | 2012-507112 A | 3/2012 |
| JP | 2013203164 A | 10/2013 |
| RU | 2660952 C2 | 7/2018 |
| WO | 2017190094 A1 | 10/2017 |
| WO | WO2018100180 A1 | 6/2018 |

* cited by examiner

FRACTIONATED SATELLITE CONSTELLATION

CROSS REFERENCES TO RELATED APPLICATIONS

The present application for patent is a Continuation of U.S. patent application Ser. No. 17/294,289 by GREENIDGE et al., entitled "FRACTIONATED SATELLITE CONSTELLATION" filed May 14, 2021, which is a 371 national phase filing of International Patent Application No. PCT/US19/62183 by GREENIDGE, et al., entitled "FRACTIONATED SATELLITE CONSTELLATION" filed Nov. 19, 2019; and to U.S. Provisional Patent Application No. 62/769,168 by GREENIDGE, et al., entitled "FRACTIONATED SATELLITE CONSTELLATION" filed Nov. 19, 2018, each of which is assigned to the assignee hereof and each of which is hereby incorporated by reference in its entirety.

BACKGROUND

The following relates generally to satellite communications and more specifically to using fractionated satellite constellations.

Satellites that are currently orbiting earth collectively provide a wide range of functionalities to user devices (e.g., communications services, imagery services, positioning services, navigation services, timing services, etc.). A subset of currently deployed satellites may each provide a large number of functionalities, while other deployed satellites may each provide a small number of functionalities (e.g., one functionality). In some cases, satellites that provide a large number of functionalities may be more expensive, complex, and larger than satellites that provide a small number of functionalities.

In the interest of reducing manufacturing and deployment costs, satellite operators may launch one or more specialized satellites that are each configured to provide a small number of functionalities. In some cases, specialized satellites may use different communication protocols and include radio components that support different communication schemes than other specialized satellites. Thus, specialized satellites may be unable to communicate with one another, and user devices may be unable to communicate with multiple specialized satellites without being configured to include radio components that support the communication protocols and schemes of each of the multiple specialized satellites.

SUMMARY

The described techniques relate to improved methods, systems, devices, and apparatuses that support fractionated satellite constellations. A gateway satellite may be orbitally-coupled with one or more specialized satellites (which may also be referred to as "tactical data link (TDL) satellites" or "auxiliary satellites") that each provide a limited number of functionalities. The gateway satellite may be configured to route communications between the one or more specialized satellites. Thus, the gateway satellite may expand the capabilities of the specialized satellites to network with additional functionalities provided by other specialized satellites, providing access for a user device to additional equipment and/or communication links that may be incompatible with communications supported by the user device.

The gateway satellite may be further configured to route communications between the one or more specialized satellites and other satellites (e.g., other gateway satellites, a commercial communications satellite). Thus, a user device that is configured for a commercial network may access specialized satellites through a gateway satellite. In some cases, another gateway satellite may be orbitally-coupled with another set of one or more specialized satellites. And the gateway satellites may be configured to route communications between the first set of one or more specialized satellites orbitally-coupled with the first gateway satellite and the other set of the one or more specialized satellites orbitally-coupled with the other gateway satellite by relaying communications between the gateway satellites. Thus, a user device may reach other user devices that are located within different coverage areas than the user device through one or more gateway satellites or other satellites.

DETAILED DESCRIPTION

Figure 1:
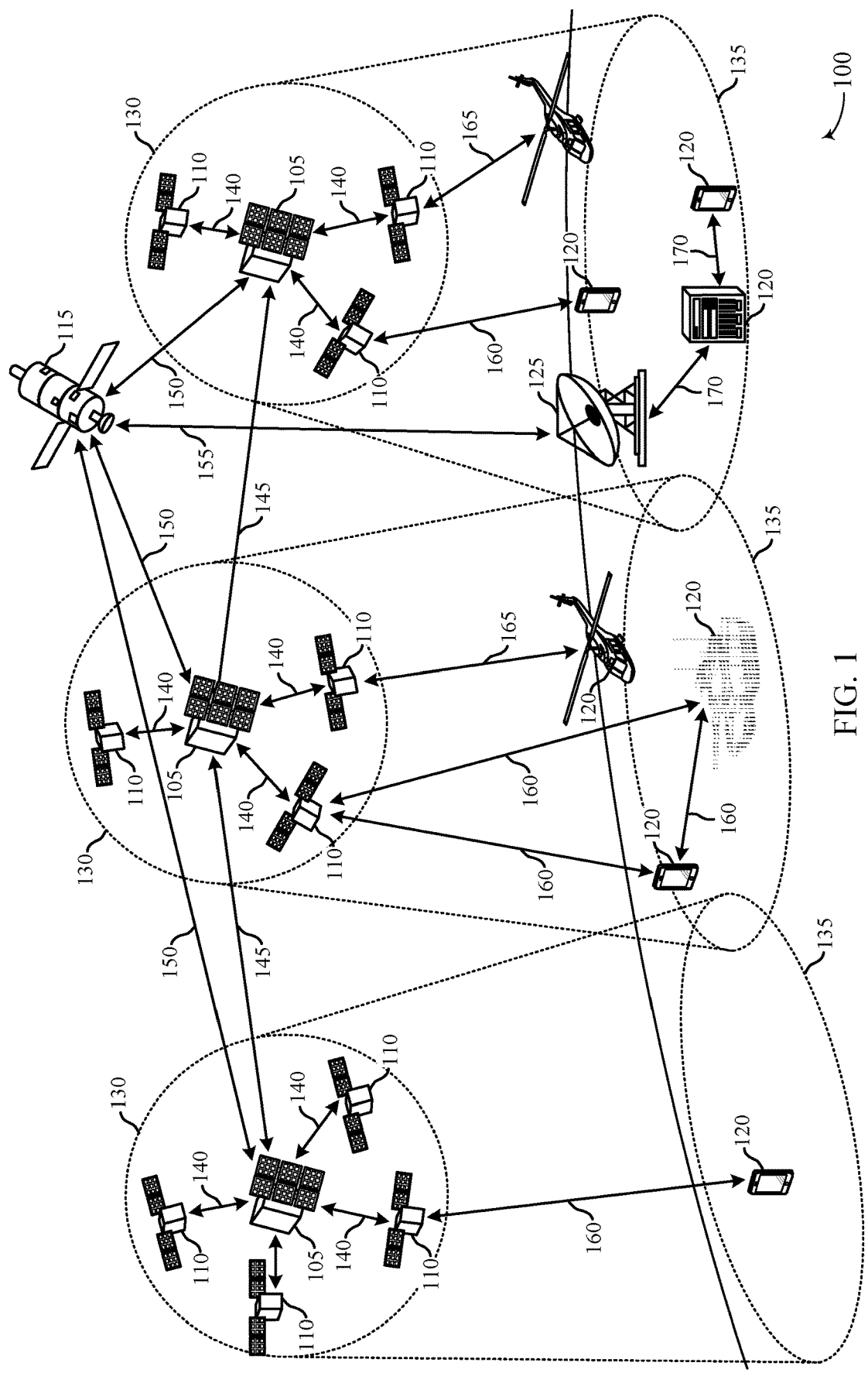
FIG. 1 illustrates an example of a satellite communications system that supports fractionated satellite constellations as disclosed herein.

A satellite communications system may include satellites (which may also be referred to as "tactical data link (TDL) satellites") that each provide different, but limited (e.g., one), functionalities (or capabilities) to connected user devices. In some cases, different TDL satellites may be configured with different payload types that support respective functionalities and/or are used to satisfy a respective mission objective for a TDL satellite. For example, one TDL satellite may be equipped with a single payload type that provides a single capability and another TDL satellite may be equipped with a different payload type that provides a different capability. In some cases, the TDL satellites may also use different communication protocols than one another. To enable a user device to access the multiple functionalities provided by the multiple TDL satellites, a user device may be configured with instructions for performing multiple communication protocols and/or with multiple sets of radio equipment to support communications with the multiple TDL satellites. But configuring a user device to support communications with multiple TDL satellites may increase a cost and/or complexity of the user device. Also, in some cases concurrent communications with multiple TDL satellites may be prevented by interference between the TDL satellites or lack of availability of a given TDL satellite.

Alternatively, to provide multiple functionalities to a user device, satellites that include more functionalities may be installed into orbit. But configuring satellites to provide more functionalities may increase cost, complexity, and/or size of the satellites. Also, in some cases a satellite may be prevented from providing concurrent functionalities by power limitations or interference between signaling used to support the different functionalities. Moreover, installing higher complexity satellites may not enable a user device to leverage existing TDL satellites that are already installed in orbit.

To increase the number of functionalities available to a user device with no, or minimal, increases to the cost, complexity, and/or size of user devices and satellites, a fractionated satellite constellation as described herein may include a gateway satellite that routes communications between auxiliary satellites (that are unable to communicate with one another). An auxiliary satellite may be a limited functionality or specialized satellite. In some cases, an auxiliary satellite may include an existing or newly launched TDL satellite. In some cases, a gateway satellite may be orbitally-coupled (or co-orbital) with one or more auxiliary satellites. That is, the gateway and auxiliary satellites may orbit in a coordinated fashion in which the gateway and auxiliary satellites may remain within direct communication range with one another throughout the orbit. For example, the gateway and auxiliary satellites may orbit in a manner that maintains a distance between the satellites of less than 1 km, less than 10 km, less than 100 km, less than 1,000 km, or some other range over which a communication protocol used for communication between the satellites may operate efficiently.

In some examples, a gateway satellite may be configured to route a communication received from one auxiliary satellite to another auxiliary satellite. For instance, an auxiliary satellite may relay a communication received from a user device to a gateway satellite, and the gateway satellite may route the communication to another auxiliary satellite. In some cases, the auxiliary satellite may respond to the communication with information generated using a functionality of the auxiliary satellite. In some cases, the auxiliary satellite may relay the communication to another user device that uses a different communication protocol than the user device. By routing communications between auxiliary satellites, a user device may gain access to functionalities (e.g., other payload types) provided by auxiliary satellites that are otherwise inaccessible to the user device—e.g., if the auxiliary satellite uses a different communication protocol than the user device. Also, by routing communications between auxiliary satellites, a user device may be connected with other user devices that use different communication protocols than the user device.

Additionally or alternatively, a gateway satellite may be configured to relay communications between commercial satellites and auxiliary satellites. For instance, a gateway satellite may receive a communication from a commercial satellite that is intended for an auxiliary satellite and may relay the communication to the auxiliary satellite. The auxiliary satellite may respond to the communication or relay the communication to a connected user device. By configuring a gateway satellite to relay communications between auxiliary satellites and commercial satellites, user devices and auxiliary satellites that are not configured to communicate over a commercial network may be connected to and have access to a commercial network. Also, a user device that is configured for a commercial network may be enabled to access functionalities of auxiliary satellites that are otherwise inaccessible to the user device and/or user devices that are not configured to communicate directly with the user device.

In some examples, another gateway satellite may be orbitally-coupled with one or more additional auxiliary satellites. In some cases, a gateway satellite that is configured to route communications between auxiliary satellites may be further configured to relay communications between gateway satellites. For instance, a gateway satellite that receives a communication from an auxiliary satellite that is intended for another auxiliary satellite (e.g., a user served by the other auxiliary satellite) that is orbitally-coupled with another gateway satellite may relay the communication to the other gateway satellite. The other gateway satellite may then relay the communication to the intended auxiliary satellite—e.g., using the techniques discussed above and the corresponding techniques discussed herein. By deploying multiple gateway satellites, a communication range of a user device may be extended into other coverage areas for communications with user devices that use a same and/or a different communication protocol than the user device. Also, a user device may be enabled to access non-communication based functionalities (e.g., satellite imagery services) provided by auxiliary satellites that cover other coverage areas.

Aspects of the disclosure are initially described in the context of a satellite communications system. Specific examples are then described of satellite communications subsystems and processes for supporting and utilizing fractionated satellite constellations. Aspects of the disclosure are further illustrated by and described with reference to apparatus diagrams, system diagrams, and flowcharts that relate to fractionated satellite constellations.

FIG. 1 illustrates an example of a satellite communications system 100 that supports fractionated satellite constellations as disclosed herein. Satellite communications system 100 may include gateway satellites 105, auxiliary satellites 110, commercial satellites 115, user devices 120, and commercial gateways 125.

Gateway satellites 105 may be configured to route communications between other satellites (e.g., other gateway satellites 105, auxiliary satellites 110, and commercial satellites 115) within satellite communications system 100. In some cases, a gateway satellite 105 is configured to support one or more communication protocols. Each communication protocol may be associated with packetization, encryption, and transmission techniques. Packetization techniques may include techniques for packaging (e.g., framing, segmenting, formatting, encoding) data for a transmission, which may include breaking data into data portions and composing data packets including header information and one or more data portions. Encryption techniques may include techniques for ciphering data—e.g., using pre-shared keys (e.g., public key cryptography). And transmission techniques may include techniques for transmitting data, which may include selecting a power and frequency range for a transmission. In some cases, encryption and transmission techniques are combined—e.g., a transmission may be transmitted over multiple frequency ranges in an order that is known only to the transmitting and receiving device.

In some examples, a gateway satellite 105 may be configured with a first communication protocol (which may also be referred to as a "gateway communication protocol") to communicate with other gateway satellites 105, auxiliary satellites 110, and/or commercial satellites 115. In other examples, a gateway satellite 105 may be configured with a first gateway communication protocol (which may also be referred to as a "gateway/gateway (GW/GW) communication protocol") to communicate with other gateway satellites 105, a second gateway communication protocol (which may also be referred to as a "gateway/TDL (GW/TDL) communication protocol") to communicate with auxiliary satellites 110, and a third gateway communication protocol (which may also be referred to as a "gateway/commercial (GW/CL) communication protocol") to communicate with commercial satellites 115. In some cases, a GW/GW communication protocol and a GW/CL communication protocol use a wide area network (WAN) communication protocol or a protocol that can support WAN protocol communications (e.g., a protocol that can support transmission control protocol (TCP), user datagram protocol (UDP), frame relay, integrated services digital network (ISDN), or point-to-point protocol (PPP)). And a GW/TDL communication protocol may use a local area network (LAN) communication protocol or a protocol that can support LAN communications (e.g., a protocol that can support Ethernet, medium access control (MAC) layer data link signaling, or wireless LAN protocols such as Wi-Fi). In some cases, these three communication protocols share common features—e.g., the three communication protocol may use the same packetization techniques—and may all be generally referred to as gateway communication protocols.

In some examples, the gateway satellite 105 may include multiple sets of radios and radio components to communicate with the different types of satellites. In some cases, a gateway satellite 105 may include a solar panel array to generate power for the gateway satellite 105—e.g., to charge a battery source at the gateway satellite 105. Additional details regarding a configuration of a gateway satellite 105 are described herein and with reference to FIGS. 12 and 13.

Auxiliary satellites 110 may be configured to provide functionalities (e.g., communication services, global positioning services, imaging services, etc.) to user devices 120. For example, different auxiliary satellites 110 may have different payload types (e.g., a communication payload supporting a communication protocol, an imaging payload, a positioning payload, a navigation payload, a timing synchronization payload). In some cases, an auxiliary satellite 110 is configured to support one or more communication protocols. In some examples, an auxiliary satellite 110 may be configured with a first communication protocol (which may also be referred to as a "TDL communication protocol") to communicate with other auxiliary satellites 110 that use the first communication protocol, user devices 120 that use the first communication protocol, and/or gateway satellites 105. In some examples, the auxiliary satellite 110 may include one set of radio and radio components to communicate with the different types of satellites. In other examples, an auxiliary satellite 110 may be configured with a TDL communication protocol to communicate with other auxiliary satellites 110 and user devices 120 that use the TDL communication protocol and a second communication protocol (e.g., a GW/TDL communication protocol) to communicate with a gateway satellite 105. In some examples, the auxiliary satellite 110 may include a set of radios and radio components to communicate with the different types of satellites—e.g., to communicate with other auxiliary satellites 110 that share a communication protocol and gateway satellites 105. In some cases, imaging payloads may include, for example, optical cameras, infrared cameras, hyperspectral imaging, synthetic aperture radar (SAR) imaging, and the like.

In some cases, an auxiliary satellite 110 may provide a TDL to user devices 120. An auxiliary satellite 110 that provides a TDL may be a limited functionality (or specialized) satellite that provides a limited number of (e.g., one) functionalities to user devices 120. In some cases, a first auxiliary satellite 110 that provides a first TDL may communicate using a first waveform and cryptography scheme and a second auxiliary satellite 110 may communicate using a second waveform and cryptography scheme. In some cases, an auxiliary satellite 110 may include a solar panel array to generate power for the auxiliary satellite 110—e.g., to charge a battery source at the auxiliary satellite 110. Additional details regarding a configuration of an auxiliary satellite 110 are described herein and with reference to FIGS. 12 and 14.

Commercial satellites 115 may be configured to provide broadband services (e.g., internet services, audio or video broadcast services, etc.) to user devices 120. In some cases, a commercial satellite 115 is configured to support one or more communication protocols. In some examples, a commercial satellite 115 may be configured with a first communication protocol (which may also be referred to as a "commercial communication protocol") to communicate with gateway satellites 105, user devices 120, and commercial gateways 125. In some examples, the commercial satellite 115 may include one set of radio and radio components to communicate with the different types of satellites. In other examples, a commercial satellite 115 may be configured with a commercial communication protocol to communicate with user devices 120 and commercial gateways 125, and a second communication protocol (e.g., a GW/CL communication protocol) to communicate with a gateway satellite 105. In some examples, a commercial satellite 115 may include multiple sets of radios and radio components to communicate with the different types of satellites. In some cases, a commercial satellite 115 may include a solar panel array to generate power for the commercial satellite 115—e.g., to charge a battery source at the commercial satellite 115.

User devices 120 may be configured to provide functionalities to or for a user (e.g., a human user, a sensor, etc.). User devices 120 may include cell phones, personal device assistants, televisions, computers, terrestrial vehicles (such as automobiles, tanks, etc.), aerial vehicles (such as airplanes, helicopters, drones, etc.). In some cases, user devices 120 may include remote sensing devices, surveillance equipment, and military instruments. User devices 120 may also include computer servers that store information for a network of user devices.

Commercial gateways 125 may be configured to route communications between a commercial satellite 115 and an earth-based commercial information network (e.g., the Internet). In some cases, a commercial information network may be an information network that is supported by significant infrastructure (e.g., commercial satellites 115, large data servers, and miles of network cable). Commercial gateways 125 may be terrestrial or aerial-based. In some cases, commercial gateways 125 may include a satellite dish that is configured to transmit and receive signals to and from commercial satellites 115. In some cases, a commercial gateway 125 may be configured to support one or more communication protocols. In some examples, a commercial gateway 125 may be configured with a first communication protocol (which may also be referred to as a "commercial gateway communication protocol") to communicate with commercial satellites 115 and user devices 120. In other examples, a commercial gateway 125 may be configured with a commercial gateway communication protocol to communicate with commercial satellites 115 and a second communication protocol (which may also be referred to as a "network protocol") to communicate with user devices 120 (such as a network server, which may be used to relay communications to personal user devices 120).

Satellites may be launched into different orbits. For example, a satellite may be launched into a geostationary earth orbit (GEO), a medium earth orbit (MEO), a low earth orbit (LEO), or a highly elliptical orbit (HEO). A GEO satellite may orbit the earth at a speed that matches the rotational speed of the earth, and thus, may remain in a single location relative to a point on the earth. A LEO satellite may orbit the earth at a speed that exceeds the rotational speed of the earth, and thus, a location of the satellite relative to a point on the earth may change as the satellite travels through the LEO. LEO satellites may be launched with low inclination (e.g., equatorial low earth orbits (ELEO) or high inclination (e.g., polar orbits) to provide different types of coverage and revisit times for given regions of the earth. A MEO satellite may also orbit the earth at a speed that exceeds the rotational speed of the earth but may be at a higher altitude than a LEO satellite. A HEO satellite may orbit the earth in an elliptical pattern where the satellite moves closer to and farther form the earth throughout the HEO. In some examples, gateway satellites 105 and auxiliary satellites 110 may be placed into LEOs and commercial satellites 115 may be placed into GEOs.

Satellites may communicate with user devices that are located within a respective geographic coverage area 135. A geographic coverage area 135 of a satellite may be based on whether the satellite has a direct communication path to a user device 120 (which may also be referred to as "line of sight" coverage). In some cases, satellites that are in different orbits may provide different levels of coverage. For example, a satellite in a LEO may cover a smaller geographic area at any one time than a GEO satellite based on the LEO satellite being closer to the earth. Also, because a location of a satellite in a LEO relative to a point on the earth changes as the satellite completes an orbit, a current geographic coverage area 135 of the satellite changes as the satellite completes the orbit—i.e., a geographic region of the earth in which user devices 120 may communicate with the satellite may move with the satellite.

In some cases, a satellite is limited to communicating with user devices 120 that are positioned within a current geographic coverage area 135 of the satellite (which may also be referred to as line of sight operation). For example, a LEO satellite that provides a communication service may be limited to connecting user devices 120 within a current geographic coverage area 135 of the satellite. In some cases, to provide constant coverage across the earth, multiple satellites (or a constellation of satellites) may be strategically deployed within a LEO and communicatively linked together (e.g., via cross links) so that a combined geographic coverage area 135 of the multiple satellites may cover a majority or all of a service area at all times. In some cases, the multiple satellites may be deployed using different LEOs (e.g., different altitude, different inclination) and/or within different time/position slots of a same LEO (e.g., same altitude, same inclination). In some examples, a first gateway satellite 105 and auxiliary satellites 110 within a cluster 130 may be positioned in a first LEO and a second gateway satellite 105 and auxiliary satellites 110 within another cluster 130 may be positioned in a second LEO. In some cases, a cluster 130 may also be referred to as a mini-constellation. The first and second LEOs may have a different altitude or inclination or may have the same altitude and inclination with different time/position slots within the orbit. A service area may be associated with the entire geographic area over which a satellite or constellation of satellites provides a service, even if the service is currently being provided to only a portion of the geographic area at a particular time.

Satellites may be used to provide a wide array of functionalities (e.g., global positioning services, earth sensing services, satellite imaging services, voice communication services, data communication services, etc.) to user devices 120. In some cases, satellites in certain orbits may be better suited to provide certain functionalities to user devices 120—e.g., a satellite in a LEO may be used to provide low latency communication services to a satellite phone, while a satellite in a GEO may be used to monitor weather patterns in a particular area.

In some cases, a single satellite (e.g., an auxiliary satellite 110 that is configured as a TDL) may be used to provide a single functionality to user devices 120. In other cases, a single satellite may be used to provide multiple functionalities to user devices—e.g., a single satellite may be used to provide a user device with a global positioning service, a communication service, and potentially additional services. In some cases, a satellite that is capable of providing multiple functionalities to a user device may be larger, heavier, and/or more complex (e.g., mechanically and electrically) than a satellite that is capable of providing fewer (e.g., one) functionalities. Also, expenses associated with launching satellites that provide multiple functionalities may be increased relative to satellites that provide fewer functionalities—e.g., if the dimensions and weight of a satellite is increased to support the multiple functionalities. Additionally, in some cases, a satellite may be unable to provide certain combinations of functionalities—e.g., if signaling for one functionality interferes with signaling for another functionality.

In some cases, a user device 120 may communicate with a satellite using a single communication protocol—e.g., if a satellite provides a single functionality or uses a same communication protocol for multiple functionalities. A communication protocol may include methods for packaging data (e.g., methods for breaking data into smaller portions, generating header information, etc.), encrypting data, and/or transmitting data (e.g., methods for performing a transmission over frequencies within a particular frequency range). In other cases, a user device 120 may communicate with a satellite using multiple communication protocols—e.g., if a satellite uses multiple communication protocols for multiple functionalities.

In some cases, a network of specialized satellites may be used to provide multiple functionalities to user devices 120. That is, multiple functionalities may be spread across multiple specialized satellites—e.g., a first satellite may provide a first functionality to a user device 120, a second satellite may provide a second functionality and a third functionality to the user device 120, a third satellite may provide a fourth functionality to the user device 120, and so on. In some cases, a first specialized satellite may transmit over a first range of frequencies and a second specialized satellite may transmit over a second range of frequencies. In some cases, the network of specialized satellites may be formed in a coordinated manner—e.g., the network of specialized satellites may include multiple satellites that are deployed by a single operator. In other cases, the network of satellites may be formed in an uncoordinated manner—e.g., the network of specialized satellites may include multiple satellites deployed by multiple operators. By spreading functionalities across multiple specialized satellites rather than including all of the functionalities into a single satellite, a user device 120 may be provided with a wide array of functionalities, and a size and complexity of the satellites serving the user device 120 may be maintained at a reasonable level.

In some cases, a user device 120 may communicate with a network of specialized satellites using a single communication protocol—e.g., if a single operator deployed the specialized satellites. In other cases, a user device 120 may communicate with a network of specialized satellites using multiple communication protocols—e.g., if different operators independently deployed the specialized satellites. For example, if a user device 120 communicates with a network of specialized satellites using multiple communication protocols, the user device 120 may use a first communication protocol to communicate with a first specialized satellite that provides a global positioning service and a second communication protocol to communicate with a second specialized satellite that provides a communication service.

Communicating with a single satellite or network of specialized satellites using multiple communication protocols may increase the cost, size, and/or complexity of a satellite and user device 120. That is, a satellite may include additional circuitry and be programmed with additional instructions to support multiple communication protocols—e.g., the satellite may have a first set of components and instructions to support communications with a first specialized satellite and a second set of components and instructions to support communications with a second specialized satellite. Similarly, a user device 120 may include additional circuitry and programming to support multiple communication protocols.

Also, in some cases, the number of functionalities that a user device 120 may access from a network of specialized satellites may be limited by a capability of the user device 120—e.g., a user device 120 that is limited to supporting two communication protocols may be limited to accessing functionalities provided by satellites that are also using the two communication protocols. Thus, a user device 120 may be unable to access desired functionalities of satellites that are within communication range of the user device 120 but that use unsupported communication protocols or incompatible radio equipment—e.g., a user device 120 may be unable to access a previously or recently launched satellite that provides different or enhanced functionalities that would benefit the user device 120.

Additionally, specialized satellites that use different communication protocols may be unable to communicate with one another. Thus, a user device 120 that uses a first functionality (e.g., a communication service) provided by a first specialized satellite may be unable to communicate with another user device 120 that also uses the first functionality provided by a second specialized satellite—e.g., because the first and second specialized satellites may be unable to communicate with one another. In some cases, the first and second specialized satellites may be deployed by different operators. In other cases, the first and second specialized satellites may be deployed by a same operator.

To increase the number of satellite functionalities available to a user device 120 without increasing, or with minor increases to, the complexity and/or size of the satellites or user device, a constellation of satellites (which may also be referred to as a cluster) including satellites that provide specialized functionalities and a satellite that routes communications between incompatible satellites (e.g., satellites that use different communication protocols) may be used.

For example, to reduce the complexity and size of the specialized satellites in a network of satellites, a gateway satellite 105 may provide a routing service to and between auxiliary satellites 110 that are included in a cluster 130. In some cases, a gateway satellite 105 and auxiliary satellites 110 that are included in a cluster 130 may be orbitally-coupled with one another. That is, the gateway satellite 105 and the auxiliary satellites 110 may remain within direct communication range of one another throughout their orbits—an example direct communication may include a communication conveyed in a signal transmitted from an auxiliary satellite 110 to a gateway satellite 105. In some examples, auxiliary satellites 110 within a cluster 130 may only communicate directly with a gateway satellite 105. In some cases, auxiliary satellites 110 may communicate with other auxiliary satellites 110 within a cluster 130 (e.g., may serve as a relay between gateway satellite 105 and other auxiliary satellites 110). In some examples, the communication paths between a gateway satellite 105 and auxiliary satellites 110 may be represented by GW/TDL communication links 140. In some cases, GW/TDL communication links 140 may also be referred to as intra-cluster communication links.

In some cases, the gateway and auxiliary satellites are deployed to maintain orbits within a certain distance of one another—e.g., within kilometers, tens of kilometers, or hundreds of kilometers. In some cases, the gateway satellite 105 may use an omnidirectional antenna or one or more directional antennas to maintain connection with the auxiliary satellites 110 that are spatially arranged around the gateway satellite 105. Thus, orbitally-coupled satellites may orbit within a range of each other suitable for communication at a power level available for satellite applications. In some cases, the auxiliary satellites are oriented in a position that enables a directional communication link to be maintained with the gateway satellite 105. In some cases, multiple clusters 130 may be configured to form a constellation of clusters 130. In some cases, orbitally-coupled satellites within a cluster 130 are positioned in a same orbital plane.

In some cases, a gateway satellite 105 may be used to route communications between a first auxiliary satellite 110 that provides a first functionality (e.g., a communications service) and uses a first communication protocol and a second auxiliary satellite 110 that provides a second functionality (e.g., a different communications service, or a satellite imaging service) and uses a second communication protocol. In some cases, the gateway satellite 105 may not provide a direct functionality to a user device 120. In some cases, the first auxiliary satellite 110 may transmit using a first range of frequencies and the second auxiliary satellite 110 may transmit using a second range of frequencies. In some examples, the first auxiliary satellite 110 and the second auxiliary satellite may be deployed in a same cluster 130 associated with a gateway satellite 105. In some cases, a current geographic coverage area 135 of the first auxiliary satellite 110 and a current geographic coverage area 135 of the second auxiliary satellite 110 may be entirely or substantially overlapping. In some examples, both geographic coverage areas 135 may include a particular user device 120 that uses the first communication protocol.

For example, a user device 120 that is connected to the first auxiliary satellite 110 may seek to obtain information from a second auxiliary satellite 110. The user device 120 may transmit a communication in accordance with the first communication protocol to the first auxiliary satellite 110 via a first TDL communication link 160. Transmitting the communication in accordance with the first communication protocol may include constructing a data packet that conforms to the first communication protocol, encrypting the data in the data packet using an encryption scheme used by the first communication protocol, and transmitting the data packet over certain frequency resources in accordance with a physical layer prescribed by the first communication protocol. In some cases, the communication may be intended for another user device 120 that uses a different communication protocol or may request a functionality that is not provided by the first auxiliary satellite 110. The first auxiliary satellite 110 may determine that the first auxiliary satellite 110 is unable to complete the communication and may relay the communication, or data included in the communication, to the gateway satellite 105 via a GW/TDL communication link 140. In some cases, the communication or data may be relayed using the first communication protocol and/or a gateway communication protocol that connects the gateway satellite 105 to the auxiliary satellites 110.

The gateway satellite 105 may decode all or a portion of the relayed communication to determine a destination for the communication. For example, the gateway satellite 105 may determine that the second auxiliary satellite 110 is the destination for the communication based on determining that the second auxiliary satellite 110 is in communication with a user device 120 that is the intended recipient of the communication. In another example, the gateway satellite 105 may determine that the second auxiliary satellite 110 is the destination for the communication based on determining that the second auxiliary satellite 110 provides a functionality requested in the communication. The gateway satellite 105 may then relay (or forward) the communication, or data from the communication, to the second auxiliary satellite 110 via a GW/TDL communication link 140—e.g., by transmitting the communication or data using the second communication protocol and/or the gateway communication protocol.

The second auxiliary satellite 110 may receive and process the relayed communication. In some examples, the second auxiliary satellite 110 may complete the relayed communication by identifying the intended user and relaying the communication to the intended user device 120 via a second TDL communication link 165. In some examples, the second auxiliary satellite 110 may perform the requested functionality (e.g., may identify an image of an identified area) and transmit a second communication including the requested information back to the gateway satellite 105 via a GW/TDL communication link 140. The gateway satellite 105 may then relay the second communication to the first auxiliary satellite 110 via a GW/TDL communication link 140, which may relay the second communication to the initial user device 120 via the first TDL communication link 160. By using the gateway satellite 105 to route communications between the first auxiliary satellite 110 and second auxiliary satellite 110, the user device 120 may be able to access the second functionality of the second auxiliary satellite 110 via the first auxiliary satellite 110 and the gateway satellite 105. That is, a gateway satellite 105 may provide interoperability between incompatible auxiliary satellites 110.

In some cases, a gateway satellite 105 may be used to route communications between a first auxiliary satellite 110 that provides a first functionality (e.g., a communications service) and uses a first communication protocol and a second auxiliary satellite 110 that provides the first functionality and uses the first communication protocol but is out of communication range with the first auxiliary satellite 110. In some examples, the first auxiliary satellite 110 may be deployed in a first cluster 130 centered around a first gateway satellite 105 and the second auxiliary satellite 110 may be deployed in a second cluster 130 centered around a second gateway satellite 105. In some cases, a current geographic coverage area 135 of the first auxiliary satellite 110 and a current geographic coverage area 135 of the second auxiliary satellite 110 may be entirely or substantially non-overlapping. In some examples, only one of the geographic coverage areas 135 may include a particular user device 120.

For example, a user device 120 that is connected to the first auxiliary satellite 110 may seek to send a communication to a second user device 120 that is connected to the second auxiliary satellite 110. The user device 120 transmit a communication in accordance with the first communication protocol to the first auxiliary satellite 110 via a first TDL communication link 160. In some cases, the first auxiliary satellite 110 may be unable to relay the communication to the second auxiliary satellite 110 (e.g., due to transmission constraints). Thus, the first auxiliary satellite 110 may relay the communication to a first gateway satellite 105 (e.g., the gateway satellite 105 associated with the cluster for the first auxiliary satellite 110) via a GW/TDL communication link 140. The first gateway satellite 105 may relay the communication to a second gateway satellite 105 that serves the second auxiliary satellite 110 via a GW/GW communication link 145. The second gateway satellite 105 may relay the communication to the second auxiliary satellite 110 via a GW/TDL communication link 140. And the second auxiliary satellite 110 may send the communication to the second user device 120 via a first TDL communication link 160. In some examples, a user device 120 may similarly access a second functionality (e.g., satellite imaging) of a second auxiliary satellite 110 that is connected to a second gateway satellite 105.

By using multiple gateway satellites 105 to relay communications between auxiliary satellites 110, a user device 120 may be capable of obtaining previously unavailable beyond line of sight information. That is, a geographic coverage area 135 for a service provided by an auxiliary satellite 110 that is itself limited to providing the service to a current geographic coverage area 135 may be extended to additional geographic coverage areas 135 that are currently covered by other auxiliary satellites 110. Also, a user device 120 may be able to access a functionality (e.g., a satellite imaging service) of an auxiliary satellite 110 that is currently covering a different geographic coverage area 135 than another auxiliary satellite 110 that is connected to or in communication range of the user device 120—e.g., a user device 120 that is configured for a communication service may obtain satellite imaging for a geographic region that is not within a geographic coverage area 135 of an auxiliary satellite 110 that provides the communication service to the user device 120 and/or an auxiliary satellite 110 that provides an imaging service for the geographic coverage area 135.

In some cases, a gateway satellite 105 may be used to route communications between a first auxiliary satellite 110 that provides a first functionality (e.g., a communications service) and uses a first communication protocol and a commercial satellite 115 that provides access to a commercial information network (e.g., the Internet) and uses a second communication protocol (e.g., an Internet Protocol).

For example, a user device 120 that is connected to the first auxiliary satellite 110 may seek to access a commercial information network. The user device 120 may transmit a communication in accordance with the first communication protocol to the first auxiliary satellite 110 via a first TDL communication link 160. The first auxiliary satellite 110 may not have a direct connection to the commercial information network, and thus, may relay the communication to a gateway satellite 105 via a GW/TDL communication link 140. After determining the communication is directed to a commercial information network (e.g., a next hop for the communication is a commercial communications satellite according to a routing table), the gateway satellite 105 may relay the communication to commercial satellite 115 via a GW/CL communication link 150. The commercial satellite 115 may relay the communication to a commercial gateway 125 via a commercial gateway communication link 155. And the commercial gateway 125 may relay the communication to the requested user device 120 (e.g., a server or personal device) via a network communication link 170. Network communication link 170 may be either a wired or wireless communication link and may span one or more networks (e.g., an Intranet or the Internet). In some cases, the commercial gateway 125 may relay the communication to a server, which may process the communication or relay the communication to a personal user device 120. In some examples, a user device 120 may similarly access a functionality of an auxiliary satellite 110 that is not configured for the commercial information network by transmitting a communication to the auxiliary satellite 110 via a commercial gateway 125, a commercial satellite 115, and a gateway satellite 105. In some examples, a commercial satellite 115 may be configured to route communications between gateway satellites 105.

By using commercial satellites 115 and gateway satellites 105 to route communications to and from auxiliary satellites 110, an auxiliary satellite 110 that otherwise does not have access to a commercial information network may be connected to the commercial information network. Thus, any user device 120 that is connected to the commercial information network may gain access to information obtained by an auxiliary satellite 110 regardless of a location of the auxiliary satellite 110.

Using a cluster 130 that is associated with a gateway satellite 105 may also enable additional functionalities to be provided to a user device 120 over time—e.g., by adding auxiliary satellites 110 to a cluster 130 associated with the gateway satellite after the gateway satellite 105 is launched and/or operational. In some cases, auxiliary satellites 110 are added to the cluster 130 by launching the auxiliary satellites 110 into a position that is orbitally-coupled with the gateway satellite 105. In some cases, a gateway satellite 105 may identify newly launched auxiliary satellites 110 using the gateway communication protocol. In some cases, the added auxiliary satellites 110 may provide a different functionality than the functionalities currently provided by auxiliary satellites 110 that are connected to the gateway satellite 105. In some cases, the added auxiliary satellite 110 may also use a different communication protocol than the currently connected auxiliary satellites 110 and/or a user device 120. But the added auxiliary satellite may be able to communicate with the gateway satellite 105 using a gateway communication protocol. Thus, the gateway satellite 105 may be able to route communications between the newly added auxiliary satellite 110 and previously connected auxiliary satellites 110. By using the gateway satellite 105 to route communications between incompatible auxiliary satellites 110, a user device 120 may access new functionalities from otherwise incompatible auxiliary satellites 110.

In some cases, an auxiliary satellite 110 that is added to a cluster 130 associated with a gateway satellite 105 may provide a redundant functionality to auxiliary satellites 110 that were previously connected to the gateway satellite 105. By launching auxiliary satellites 110 that provided redundant functionalities into the cluster 130, the cluster 130 may become more robust to failures of auxiliary satellites 110 or able to support additional user devices 120 or higher data rates.

Thus, by deploying a cluster 130 including auxiliary satellites 110 and a gateway satellite 105 that provides a connection between incompatible satellites that provide common or different functionalities, a collection of stand-alone satellites may be transformed into an interconnected network of satellites. Thus, the functionalities available to user devices 120 that can access one of the auxiliary satellites 110 may be expanded to access otherwise inaccessible functionalities provided by other auxiliary satellites 110. Also, a wide array of functionalities may be provided to a user device 120 while using low complexity satellites that each provide a limited number of functionalities and without configuring multiple communication protocols at the satellites or user device 120.

In some cases, a gateway satellite 105 may be configured to provide command and control to auxiliary satellites 110 that are within a cluster 130. For example, auxiliary satellites 110 may not support direct communication with ground stations for command and control and gateway satellite 105 may thus support the single command and control interface for the auxiliary satellites 110. In some examples, gateway satellite 105 may determine commands for auxiliary satellites (e.g., based on determining an orbit change, positioning change, or antenna pointing change, communication parameter change). For example, gateway satellite 105 may include sensors or other devices for determining when to modify settings or orbital characteristics for an auxiliary satellite 110. Additionally or alternatively, gateway satellite 105 may receive commands for the auxiliary satellites 110 from a control center (e.g., via a ground link or link to a commercial communications satellite). In some cases, the command and control is associated with instructions for maintaining an orbit of the auxiliary satellites 110 within the cluster 130. In some examples, gateway satellite 105 may send a command that instructs one or more auxiliary satellites 110 to modify an orbital path—e.g. to correct an orbit of an auxiliary satellite 110 or to avoid debris. In some examples, gateway satellite 105 may send a command that instructs one or more auxiliary satellites 110 to de-orbit.

Figure 2:
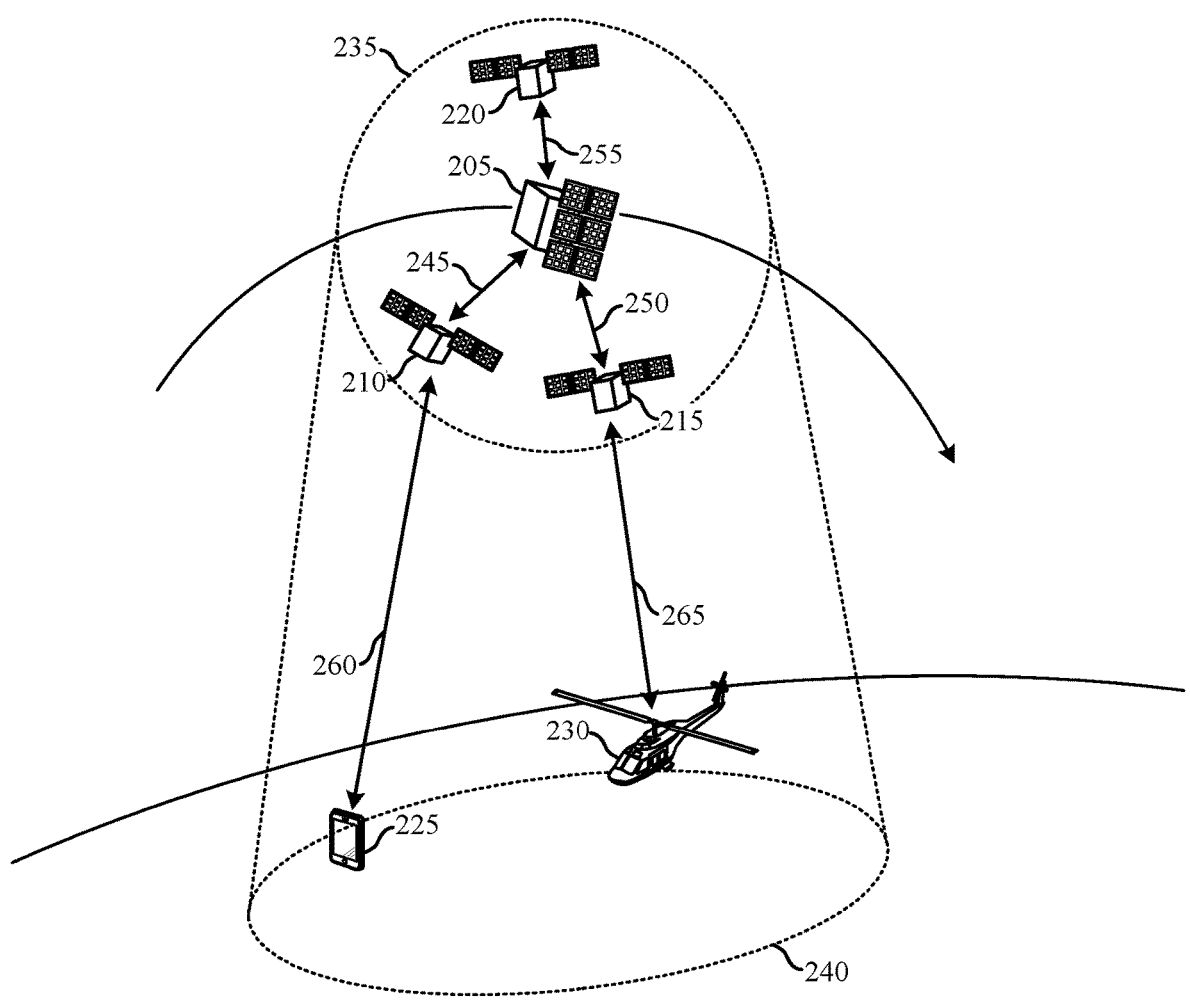
FIG. 2 illustrates aspects of a satellite communications subsystem that supports fractionated satellite constellations as disclosed herein.

FIG. 2 illustrates aspects of a satellite communications subsystem 200 that supports fractionated satellite constellations as disclosed herein. Satellite communications subsystem 200 may include gateway satellite 205, which may be an example of a gateway satellite described with reference to FIG. 1. Gateway satellite 205 may be a LEO satellite.

Satellite communications subsystem 200 may include first auxiliary satellite 210, second auxiliary satellite 215, and third auxiliary satellite 220, which may be examples of auxiliary satellites described with reference to FIG. 1. First auxiliary satellite 210, second auxiliary satellite 215, and third auxiliary satellite 220 may be orbitally-coupled with gateway satellite 205, as generally described with reference to FIG. 1. Thus, gateway satellite 205, first auxiliary satellite 210, second auxiliary satellite 215, and third auxiliary satellite 220 may be arranged within cluster 235 and may communicate with one another using first GW/TDL communication link 245, second GW/TDL communication link 250, and third GW/TDL communication link 255, as generally described with reference to FIG. 1.

In some cases, first auxiliary satellite 210 may be configured for a first TDL communication protocol, second auxiliary satellite 215 may be configured for a second TDL communication protocol, and third auxiliary satellite 220 may be configured for a third TDL communication protocol. In some cases, additional auxiliary satellites may be added into cluster 235—e.g., by launching auxiliary satellites into positions that are orbitally-coupled with gateway satellite 205. In some cases, gateway satellite 205 may identify auxiliary satellites that are orbitally-coupled with gateway satellite 205 by transmitting discovery messages in accordance with a gateway communication protocol.

Satellite communications subsystem 200 may include first user device 225 and second user device 230, which may be examples of user devices described with reference to FIG. 1. First user device 225 and second user device 230 may be located within geographic coverage area 240 of cluster 235. First user device 225 may communicate with second auxiliary satellite 215 using a first TDL communication link 260, and second user device 230 may communicate with second auxiliary satellite 215 using a second TDL communication link 265, as generally described with reference to FIG. 1. In some cases, first user device 225 may be configured for the first TDL communication protocol and second user device 230 may be configured for the second TDL communication protocol.

As discussed above and herein, a first auxiliary satellite (e.g., first auxiliary satellite 210) may be configured with a first TDL communication protocol and provide a first functionality and a second auxiliary satellite (e.g., second auxiliary satellite 215) may be configured with a second TDL communication protocol and provide a second functionality. The first auxiliary satellite and second auxiliary satellite may also currently cover a substantially overlapping geographic region. In some cases, a user device that is located within the substantially overlapping geographic region may be able to access only one of the auxiliary satellites—e.g., if the user device is configured for only one of the first and second TDL communication protocols. Thus, the user device may be prevented from communicating with other user devices within the substantially overlapping geographic region. Also, the user device may be prevented from accessing a functionality of other auxiliary satellites (e.g., third auxiliary satellite 220) that are otherwise within communication range of the user device.

To increase the number of functionalities available to a user device and/or to connect user devices that use incompatible TDL communication protocols, a gateway satellite (e.g., gateway satellite 205) may be orbitally-coupled with auxiliary satellites (e.g., first auxiliary satellite 210, second auxiliary satellite 215, and third auxiliary satellite 220) to form a cluster 235 of satellites. The gateway satellite may be configured to route communications between the auxiliary satellites—e.g., using protocol translation and waveform normalization techniques.

By orbitally coupling the gateway satellite with multiple auxiliary satellites, the functionalities of all of the auxiliary satellites may be made available to user devices (e.g., first user device 225 and second user device 230) within a geographic coverage area of the cluster. Similarly, a user device that uses a first TDL communication protocol (e.g., first user device 225) may be able to communicate with another user device that uses a second TDL communication protocol (e.g., second user device 230) via the gateway satellite. Exemplary communications utilizing a gateway satellite to provide additional functionalities and to connect otherwise incompatible user devices are discussed in more detail herein and with respect to FIGS. 3 and 4.

Figure 3:
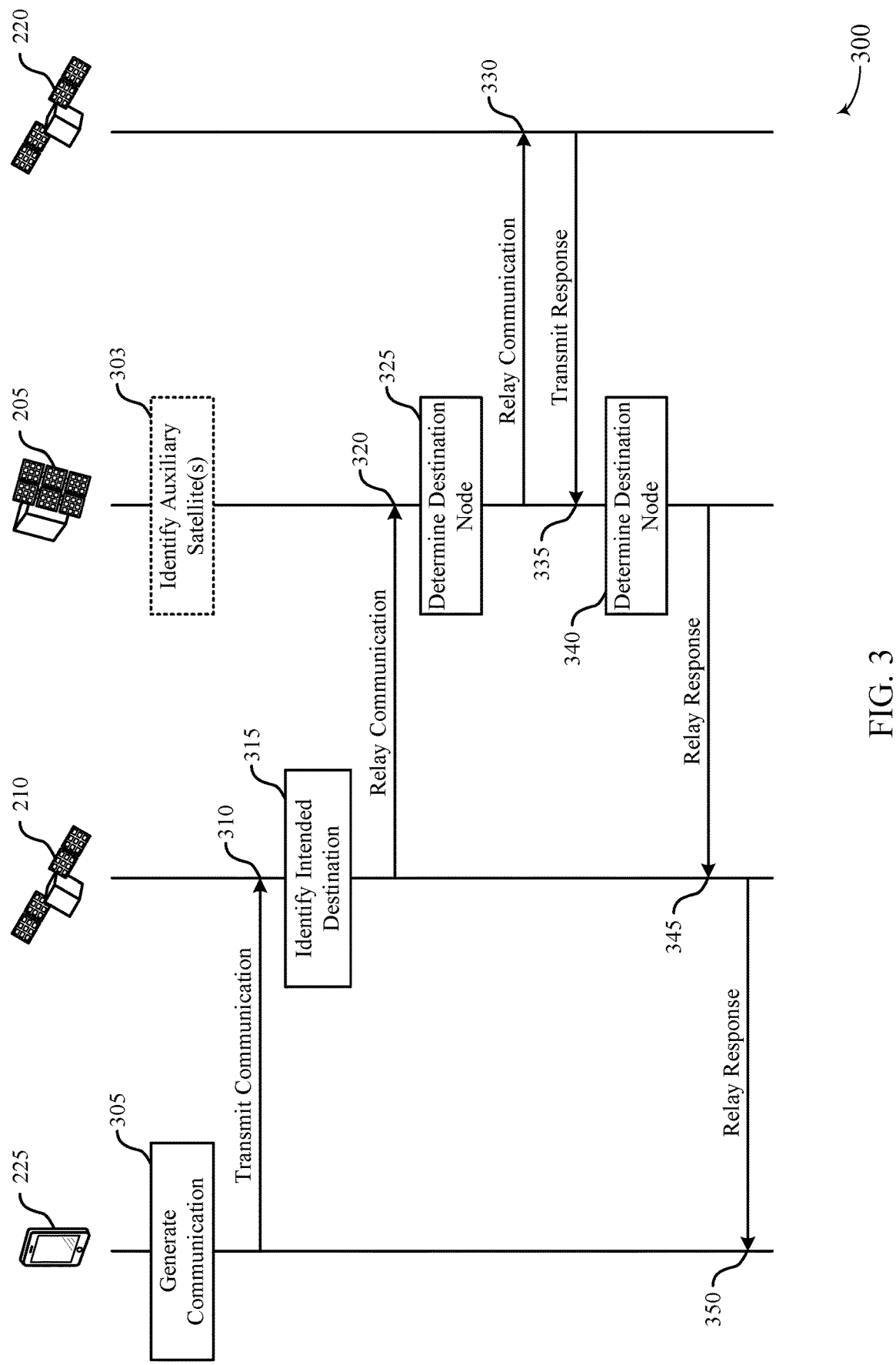
FIGS. 3 and 4 illustrates aspects of processes that support and utilize a fractionated satellite constellation as disclosed herein.

FIG. 3 illustrates aspects of a process flow 300 that supports and utilizes a fractionated satellite constellation as disclosed herein. Process flow 300 may be performed by gateway satellite 205, first auxiliary satellite 210, third auxiliary satellite 220, and first user device 225 described with reference to FIG. 2. In some examples, process flow 300 illustrates aspects of a process that enables a user device to access a functionality of an auxiliary satellite that is otherwise inaccessible to the user device by using a gateway satellite.

At block 303, gateway satellite 205 may identify one or more auxiliary satellites (including first auxiliary satellite 210 and third auxiliary satellite 220) that are orbitally-coupled with gateway satellite 205. In some cases, gateway satellite 205 discovers the one or more auxiliary satellites by broadcasting discovery messages. In some examples, gateway satellite 205 may discover first auxiliary satellite 210 after receiving a discovery response message. In some cases, gateway satellite 205 may discover a first set of auxiliary satellites during a first discovery procedure and may discover a second set of auxiliary satellites during a subsequent procedure. In some examples, the first set of auxiliary satellites may be launched with gateway satellite 205 and the second set of auxiliary satellites may be launched after the first set of auxiliary satellites. In some examples, the discovery and response messages are transmitted in accordance with a gateway communication protocol. After identifying an auxiliary satellite, gateway satellite 205 may establish a connection with the auxiliary satellite.

At block 305, first user device 225 may generate a communication. In some cases, the communication may include a request to obtain information associated with a functionality provided by third auxiliary satellite 220. As discussed above, first user device 225 may be unable to communicate directly with third auxiliary satellite 220—e.g., due to communication protocol incompatibilities and/or transmission failures.

At arrow 310, first user device 225 may transmit the communication to first auxiliary satellite 210 using a first TDL communication protocol via first TDL communication link 260. Transmitting the communication using the first TDL communication protocol may include encrypting a request included in the communication, packaging the encrypted request into a data packet, and transmitting the data packet as a waveform in accordance with the first TDL communication protocol.

At block 315, first auxiliary satellite 210 may identify an intended destination of the communication. In some cases, identifying the intended destination includes identifying that the communication is not directed to a user device that is currently in communication with first auxiliary satellite 210. In some cases, first auxiliary satellite 210 determines the intended user device is not currently in communication with first auxiliary satellite 210 by decoding a receiver address included in the communication and failing to match the receiver address with a list of addresses for active user devices—e.g., a list of user devices that are currently in communication range of first auxiliary satellite 210.

At arrow 320, first auxiliary satellite 210 may relay the communication to gateway satellite 205 via first GW/TDL communication link 245 based on determining that the communication is not directed to a user device that is currently in communication with first auxiliary satellite 210. In some cases, first auxiliary satellite 210 relays the communication by transmitting the communication using a GW/TDL communication protocol. Transmitting the communication using the GW/TDL communication protocol may include extracting data from the communication, encrypting the data, repackaging the data in a data packet, and transmitting the data packet in a waveform in accordance with the GW/TDL communication protocol. In some cases, the extracted data is encrypted in accordance with standards of the second TDL communication protocol. In other cases, transmitting the communication using the GW/TDL communication protocol includes encapsulating the communication in a data packet that is composed according to the GW/TDL communication protocol without extracting the data from the communication. In other cases, first auxiliary satellite 210 relays the communication by relaying the communication using the first TDL communication protocol without extracting the data from the communication.

At block 325, gateway satellite 205 may determine a destination node for the communication. In some cases, determining the destination node includes decrypting data in the communication and/or identifying a receiver address included in the communication. In some cases, gateway satellite 205 may compare a decoded receiver address with a list of addresses for auxiliary satellites that are included in cluster 235 and/or a list of addresses for active user devices that are currently in communication range of cluster 235 (e.g., within geographic coverage area 240). In some examples, gateway satellite 205 may determine that the communication is intended for third auxiliary satellite 220— e.g., based on matching a decoding address with an address stored for third auxiliary satellite 220.

In some examples, gateway satellite 205 may maintain a LAN for communication with auxiliary satellites of cluster 235. For example, gateway satellite 205 may serve as an access point (AP) for a LAN of cluster 235, and may perform NAT between the LAN of the cluster 235 and WAN addresses. Gateway satellite 205 may assign LAN addresses to auxiliary satellites within cluster 235 (e.g., auxiliary satellites may be given LAN addresses on the same subnet). Gateway satellite 205 may perform NAT such that communications to and from each auxiliary satellite may be routed by the gateway satellite 205 via other gateway satellites or commercial communication satellites (e.g., using WAN routing or public IPv4 or IPv6 addresses). Gateway satellite 205 may perform static or dynamic NAT, and may push updates for routing tables of neighboring hops on the WAN (e.g., other gateway satellites 205, commercial communication satellites).

In some examples, gateway satellite 205 may include a routing table for determining a communication path from gateway satellite 205 to the intended auxiliary satellite or user device. In some cases, the routing table indicates a communication path for reaching an intended auxiliary satellite or user device via one or more intermediary satellites (e.g., intermediary auxiliary, gateway, and/or commercial satellites). For example, after determining a receiver address, gateway satellite 205 may determine that the associated auxiliary satellite or user device is currently covered by gateway satellite 205 and may relay the communication to the auxiliary satellite or an auxiliary satellite that is connected to the user device. In another example, after determining a receiver address, gateway satellite 205 may determine that the associated auxiliary satellite or user device is not served by gateway satellite 205 and may consult its routing table to find the next communication hop for the communication path to the receiver address. Gateway satellite 205 may transmit the communication to the network node (e.g., other gateway satellite, commercial communications satellite) determined to be the next hop based on the routing table. For example, the network node may be an intermediary gateway satellite that may then transmit the communication to a gateway satellite serving the auxiliary satellite associated with the receiver address based on a routing table stored at the intermediary gateway satellite, and the gateway satellite may transmit the communication to the intended auxiliary satellite.

At arrow 330, gateway satellite 205 may relay the communication to third auxiliary satellite 220 via third GW/TDL communication link 255 based on determining that third auxiliary satellite 220 is the next network hop (e.g., according to a routing table) for the communication. In some cases, relaying data extracted from the communication to third auxiliary satellite 220 includes packaging, encrypting, and/or transmitting the communication in accordance with a GW/TDL communication protocol. In other cases, gateway satellite 205 relays the communication without extracting the data by encapsulating a request included in the communication in a data packet that is composed according to the GW/TDL communication protocol. In other cases, gateway satellite 205 relays the communication without extracting the data by relaying the communication using the third TDL communication protocol used by third auxiliary satellite 220.

At arrow 335, third auxiliary satellite 220 may transmit, to gateway satellite 205, a response to a request included in the communication via third GW/TDL communication link 255. In some cases, the response may include data acquired using a functionality provided by third auxiliary satellite 220. For example, third auxiliary satellite 220 may be configured to obtain satellite imaging and may transmit a response including an image of a particular location based on decoding a request asking for an image of the particular location. Third auxiliary satellite 220 may transmit the response using either a GW/TDL communication protocol or a third TDL communication protocol.

At arrow 340, gateway satellite 205 may determine a destination node for the response as similarly described with reference to block 325. In some cases, gateway satellite 205 may determine that first auxiliary satellite 210 is the destination node.

At arrow 345, gateway satellite 205 may relay the response received from third auxiliary satellite 220 to first auxiliary satellite 210 via first GW/TDL communication link 245—e.g., using either a GW/TDL or a first TDL communication protocol.

At arrow 350, first auxiliary satellite 210 may relay the response to first user device 225 via first TDL communication link 260—e.g., using the first TDL communication protocol. After receiving the response, first user device 225 may decode the data packet. Thus, first user device 225 may access a functionality of an auxiliary satellite that uses a different communication protocol or is out of communication range of first user device 225.

Figure 4:
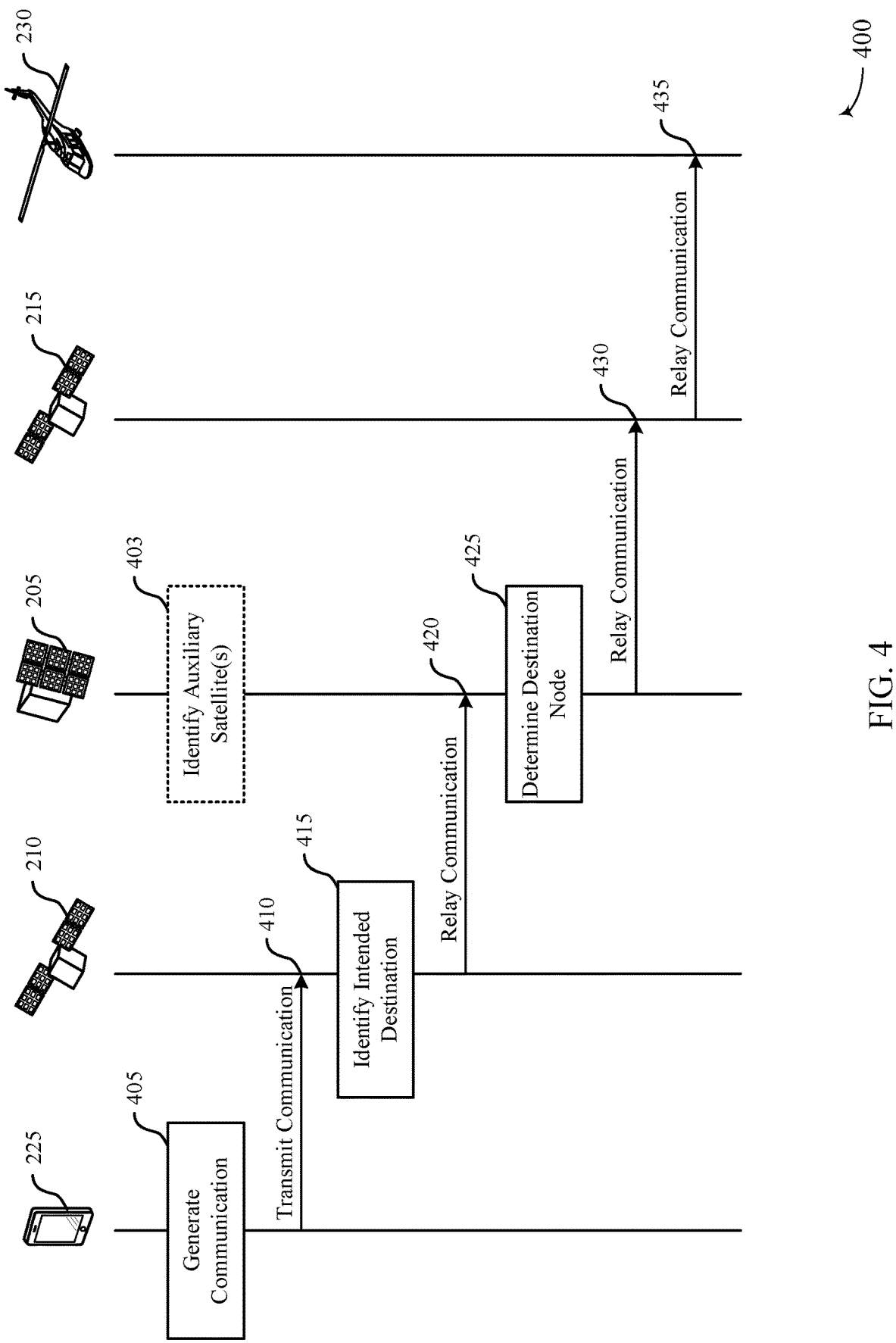

FIG. 4 illustrates aspects of a process flow 400 that supports and utilizes a fractionated satellite constellation as disclosed herein. Process flow 400 may be performed by gateway satellite 205, first auxiliary satellite 210, second auxiliary satellite 215, first user device 225, and second user device 230 as described with reference to FIG. 2. In some examples, process flow 400 illustrates aspects of a process that enables a user device to communicate with another user device that is configured with an incompatible communication protocol.

At block 403, gateway satellite 205 may identify one or more auxiliary satellites as similarly described with reference to block 303 of FIG. 3.

At block 405, first user device 225 may generate a communication. In some cases, the communication may include a message (e.g., a voice or data message) for second user device 230. As discussed above, first user device 225 may be unable to communicate directly with second user device 230—e.g., due to communication protocol incompatibilities and/or transmission failures.

At arrow 410, first user device 225 may transmit the communication to first auxiliary satellite 210 via first TDL communication link 260 as similarly described with reference to arrow 310 of FIG. 3. At block 415, first auxiliary satellite 210 may identify an intended destination of the communication as similarly described with reference to block 315 of FIG. 3. At arrow 420, first auxiliary satellite 210 may relay the communication to gateway satellite 205 via first GW/TDL communication link 245 as similarly described with reference to arrow 320 of FIG. 3. At block 425, gateway satellite 205 may determine a destination node for the communication as similarly described with reference to block 325 of FIG. 3. At block 430, gateway satellite 205 may relay the communication to second auxiliary satellite 215 via second GW/TDL communication link 250 as similarly described with reference to arrow 330 of FIG. 3.

At arrow 435, second auxiliary satellite 215 may relay the communication to second user device 230. In some cases, second auxiliary satellite 215 relays the communication to second user device 230 using a second communication protocol. Thus, first user device 225 may communicate with another user device that uses a different communication protocol than first user device 225. In some cases, second user device 230 may similarly transmit messages (e.g., a response) to first user device 225.

Figure 5:
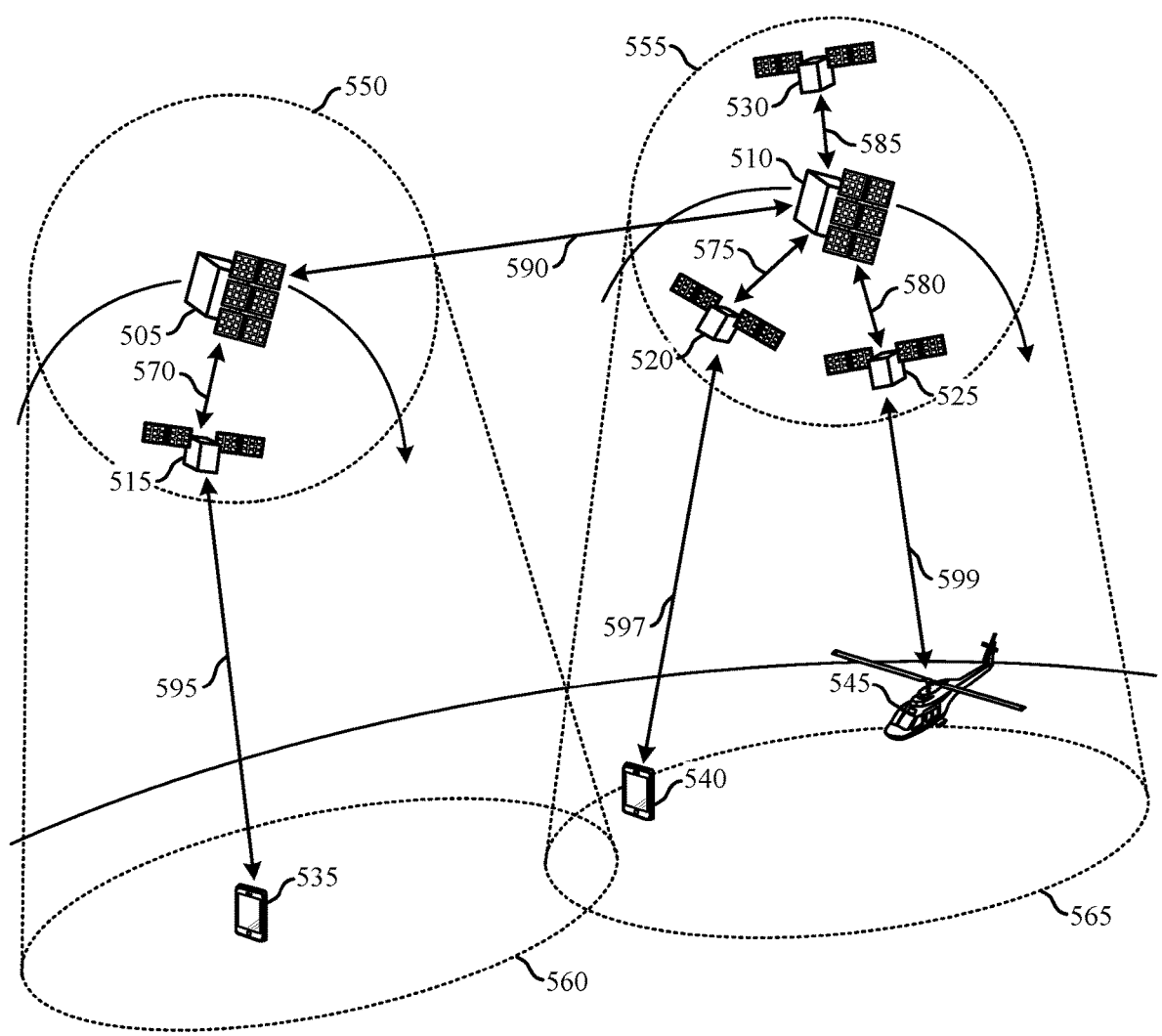
FIG. 5 illustrates aspects of a satellite communications subsystem that supports fractionated satellite constellations as disclosed herein.

FIG. 5 illustrates aspects of a satellite communications subsystem 500 that supports fractionated satellite constellations as disclosed herein. Satellite communications subsystem 500 may include first gateway satellite 505 and second gateway satellite 510, which may be examples of gateway satellites described with reference to FIGS. 1 through 4. In some cases, first gateway satellite 505 may be positioned in a first LEO and second gateway satellite 510 may be positioned in a second LEO. For example, second LEO may be in the same orbital plane and offset in phase (e.g., 90 degrees) from first LEO. In other cases, first gateway satellite 505 may be positioned in a LEO orbit of a different orbital plane.

Satellite communications subsystem 500 may include first auxiliary satellite 515, second auxiliary satellite 520, third auxiliary satellite 525, and fourth auxiliary satellite 530, which may be examples of auxiliary satellites described with reference to FIGS. 1 through 4. First auxiliary satellite 515 may be orbitally-coupled with first gateway satellite 505, as generally described with reference to FIG. 1. Thus, first gateway satellite 505 and first auxiliary satellite 515 may be arranged within first cluster 550 and may communicate with one another using first GW/TDL communication link 570, as generally described with reference to FIGS. 1 through 4. Second auxiliary satellite 520, third auxiliary satellite 525, and fourth auxiliary satellite 530 may be orbitally-coupled with second gateway satellite 510, as generally described with reference to FIG. 1. Thus, second gateway satellite 510, second auxiliary satellite 520, third auxiliary satellite 525, and fourth auxiliary satellite 530 may be arranged within second cluster 555 and may communicate with one another using second GW/TDL communication link 575, third GW/TDL communication link 580, and fourth GW/TDL communication link 585, as generally described with reference to FIG. 1.

In some cases, first auxiliary satellite 515 and second auxiliary satellite 520 may be configured for a first TDL communication protocol, third auxiliary satellite 525 may be configured for a second TDL communication protocol, and fourth auxiliary satellite 530 may be configured for a third TDL communication protocol.

Satellite communications subsystem 500 may include first user device 535, second user device 540, and third user device 545 which may be examples of user devices described with reference to FIGS. 1 through 4. First user device 535 may be located within first geographic coverage area 560 of first cluster 550. First user device 535 may communicate with first auxiliary satellite 515 using a first TDL communication link 595. Second user device 540 and third user device 545 may be located within second geographic coverage area 565 of second cluster 555. Second user device 540 may communicate with second auxiliary satellite 520 using a second TDL communication link 597, and third user device 545 may communicate with third auxiliary satellite 525 using a third TDL communication link 599, as generally described with reference to FIGS. 1 through 4.

In some cases, first user device 535 and second user device 540 may be configured for the first TDL communication protocol and third user device 545 may be configured for the second TDL communication protocol. In some cases, second user device 540 may communicate with fourth auxiliary satellite 530 and/or third user device 545 within second geographic coverage area 565, as generally described with reference to FIGS. 2 through 4. Similarly, in some cases, first user device 535 may communicate with auxiliary satellites within first cluster 550 and user devices within first geographic coverage area 560, as similarly described with reference to FIGS. 2 through 4.

As discussed above and herein, a first auxiliary satellite (e.g., first auxiliary satellite 515) may be configured for providing a communication service for user devices that use a first TDL communication protocol within a current coverage area of the first auxiliary satellite. In some cases, a user device may be unable to communicate with other user devices that are located in a current coverage area of a second auxiliary satellite (e.g., second auxiliary satellite 520)—e.g., if the first auxiliary satellite is unable to reach the second auxiliary satellite.

To extend a communications range of a user device within a first coverage area to reach user devices located in different coverage areas, a first gateway satellite (e.g., first gateway satellite 505) may be orbitally-coupled with a first auxiliary satellite (e.g., first auxiliary satellite 515) to form a first cluster of satellites (e.g., second cluster 555) and a second gateway satellite (e.g., second gateway satellite 510) may be orbitally-coupled with a second auxiliary satellite (e.g., second auxiliary satellite 520) to form a second cluster of satellites (e.g., second cluster 555). The first gateway satellite may be configured to route communications from the first auxiliary satellite to the second gateway satellite—e.g., via GW/GW communication link 590. And the second gateway satellite may relay the communication to the second auxiliary satellite, which may transmit the communication to a second user device in a different coverage area than the first user device.

In some cases, a commercial satellite (not shown) may be used in combination with the system shown in FIG. 5 and used to relay communications between gateway satellites. For example, a commercial satellite may be configured to route communication between first gateway satellite 505 and second gateway satellite 510 if GW/GW communication link 590 is not present between first gateway satellite 505 and second gateway satellite 510 or there is a failure of GW/GW communication link 590.

By forming multiple, interconnected clusters, the communication range of a user device may be extended to other coverage areas. Similarly, a user device may be able to communicate with other user devices that use different TDL communication protocols than the user device or are located in different coverage areas. Also, a user device may access functionalities of auxiliary satellites that use different TDL communication protocols than the user device and that are currently covering a different coverage area. Exemplary communications utilizing a constellation of gateway satellites to extend a communication range of a user device, to provide additional functionalities to the user device, and to connect the user device to otherwise incompatible user devices located in different coverage areas are discussed in more detail herein and with respect to FIGS. 6 through 8.

Figure 6:
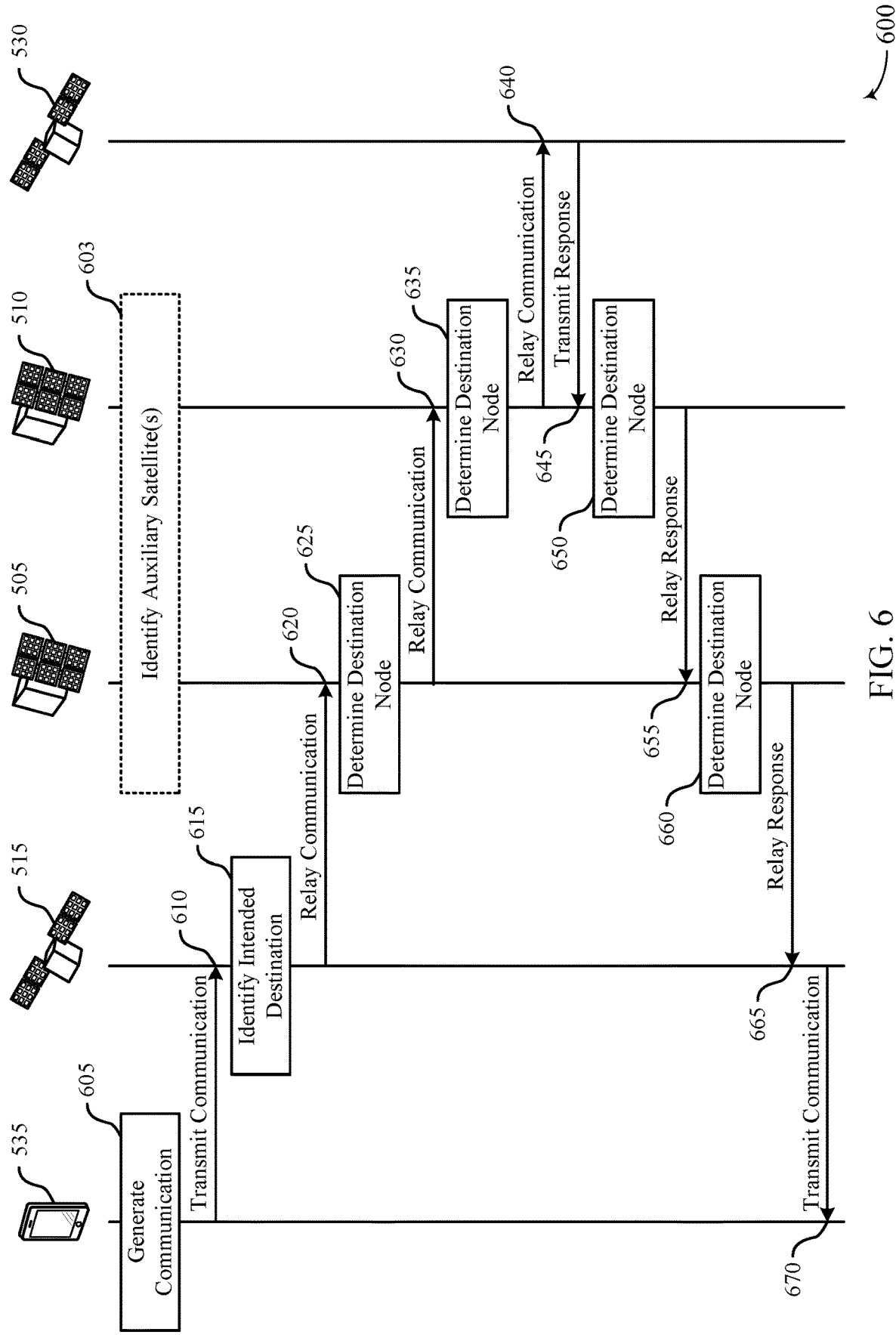
FIGS. 6 through 8 illustrates aspects of processes that support and utilize a fractionated satellite constellation as disclosed herein.

FIG. 6 illustrates aspects of a process flow 600 that supports and utilizes a fractionated satellite constellation as disclosed herein. Process flow 600 may be performed by first gateway satellite 505, second gateway satellite 510, first auxiliary satellite 515, fourth auxiliary satellite 530, and first user device 535 described with reference to FIG. 5. In some examples, process flow 600 illustrates aspects of a process that enables a user device to access a functionality of an auxiliary satellite that uses a different communication protocol than the user device and has a current coverage area that is substantially non-overlapping with an auxiliary satellite that is currently connected to the user device.

At block 603, first gateway satellite 505 may identify one or more auxiliary satellites (including first auxiliary satellite 515) that are orbitally-coupled with first gateway satellite 505, and second gateway satellite 510 may identify one or more auxiliary satellites (e.g., fourth auxiliary satellite 530) that are orbitally-coupled with second gateway satellite 510. In some cases, first gateway satellite 505 and second gateway satellite 510 discover the one or more auxiliary satellites based on broadcasting discovery messages and receiving response messages. In some examples, the discovery and response messages are transmitted in accordance with a gateway communication protocol. After identifying an auxiliary satellite, first gateway satellite 505 may establish a connection with the auxiliary satellite.

At block 605, first user device 535 may generate a communication. In some cases, the communication may include a request to obtain information associated with a functionality provided by fourth auxiliary satellite 530. As discussed above, first user device 535 may be unable to communicate directly with fourth auxiliary satellite 530—e.g., due to communication protocol incompatibilities and/or transmission failures.

At arrow 610, first user device 535 may transmit the communication to first auxiliary satellite 515 using a first TDL communication protocol via first TDL communication link 595. Transmitting the communication using the first TDL communication protocol may include encrypting a request included in the communication, packaging the encrypted request into a data packet, and transmitting the data packet as a waveform in accordance with the first TDL communication protocol.

At block 615, first auxiliary satellite 515 may identify an intended destination of the communication. In some cases, identifying the intended destination includes identifying that the communication is not directed to a user device that is currently in communication with first auxiliary satellite 515. In some cases, first auxiliary satellite 515 determines the intended user device is not currently in communication with first auxiliary satellite 515 by decoding a receiver address included in the communication and failing to match the receiver address with a list of addresses for active user devices—e.g., a list of user devices that are currently in communication range of first auxiliary satellite 515.

At arrow 620, first auxiliary satellite 515 may relay the communication to first gateway satellite 505 via first GW/TDL communication link 570 based on determining that the communication is not directed to a user device that is currently in communication with first auxiliary satellite 515. In some cases, first auxiliary satellite 515 relays the communication by transmitting the communication, or data from the communication, using a GW/TDL communication protocol. Transmitting the communication using the GW/TDL communication protocol may include extracting data from the communication, encrypting the data, repackaging the data in a data packet, and transmitting the data packet in a waveform in accordance with the GW/TDL communication protocol. In some cases, the extracted data is encrypted in accordance with standards of the second TDL communication protocol. In other cases, transmitting the communication using the GW/TDL communication protocol includes encapsulating the communication in a data packet that is composed according to the GW/TDL communication protocol without extracting the data from the communication. In other cases, first auxiliary satellite 515 relays the communication by relaying the communication using the first TDL communication protocol without extracting the data from the communication.

At block 625, first gateway satellite 505 may determine a destination node for the communication. In some cases, determining the destination node includes decrypting data in the communication and/or identifying a receiver address included in the communication. In some cases, first gateway satellite 505 may compare a decoded receiver address with a list of addresses (e.g., included in a routing table) for auxiliary satellites that are included in first cluster 550 and/or a list of addresses for active user devices that are currently in communication range of first cluster 550. In some examples, first gateway satellite 505 may determine that an intended destination node is not within first cluster 550 or within first geographic coverage area 560 of first cluster 550. In some examples, first gateway satellite 505 may include a routing table that indicates a communication path from first gateway satellite 505 to an intended auxiliary satellite or user device. In some cases, a communication path includes one or more intermediary satellites.

In some examples, first gateway satellite 505 may maintain a LAN for communication with auxiliary satellites of cluster 550. For example, first gateway satellite 505 may serve as an AP for a LAN of cluster 550, and may perform NAT between the LAN of the cluster 550 and WAN addresses. Gateway satellite 505 may assign LAN addresses to auxiliary satellites within cluster 550 (e.g., auxiliary satellites may be given LAN addresses on the same subnet).

First gateway satellite 505 may perform NAT such that communications to and from each auxiliary satellite may be routed by the first gateway satellite 505 via other gateway satellites (e.g., second gateway satellite 510) or commercial communication satellites (e.g., using WAN routing or public IPv4 or IPv6 addresses). For example, first gateway satellite 505 may determine that a communication is directed to another gateway satellite and may translate a source address included in the communication based on the WAN address of first gateway satellite 505 and a particular port (e.g., associated with an auxiliary satellite of cluster 550). Additionally or alternatively, first gateway satellite 505 may translate communications received with a destination address matching the WAN address of the first gateway satellite to auxiliary satellites of the cluster 550 based on their respective port addresses. First gateway satellite 505 may perform static or dynamic NAT, and may push updates for routing tables of neighboring hops on the WAN (e.g., other gateway satellites, commercial communication satellites).

At arrow 630, first gateway satellite 505 may relay the communication to second gateway satellite 510 via GW/GW communication link 590 based on determining that the communication is intended for a node that is currently covered by second cluster 555—e.g., based on the identified receiver address and/or routing table. In some examples, first gateway satellite 505 may relay the communication to second gateway satellite 510 based on determining that the communication is intended for fourth auxiliary satellite 530—e.g., based on matching a decoding address with an address stored for fourth auxiliary satellite 530 and routing table. In some cases, first gateway satellite 505 relays the communication to second gateway satellite 510 by transmitting the communication in accordance with a GW/GW communication protocol. Transmitting the communication in accordance with the GW/GW communication protocol may include encapsulating the communication in a data packet that is composed in accordance with the GW/GW communication protocol. In some cases, first gateway satellite 505 may relay the communication to an intermediary gateway satellite that relays the communication to second gateway satellite 510—e.g., based on a routing table stored at first gateway satellite 505 and/or a failure of GW/GW communication link 590.

At block 635, second gateway satellite 510 may determine a destination node for the communication as similarly described with reference to block 625. In some cases, second gateway satellite 510 may determine that the communication is intended for fourth auxiliary satellite 530—e.g., based on matching a decoding address with an address stored for fourth auxiliary satellite 530. In other cases, second gateway satellite 510 may determine that the communication is intended for a node that is not included within second cluster 555 and may similarly relay the communication to a third gateway satellite via a GW/GW communication link.

In some examples, second gateway satellite 510 may maintain a LAN for communication with auxiliary satellites of cluster 555. For example, second gateway satellite 510 may serve as an AP for a LAN of cluster 555, and may perform network address translation (NAT) between the LAN of the cluster 555 and WAN addresses. Second gateway satellite 510 may assign LAN addresses to auxiliary satellites within cluster 555 (e.g., auxiliary satellites may be given LAN addresses on the same subnet). Second gateway satellite 510 may perform NAT such that communications to and from each auxiliary satellite may be routed by the second gateway satellite 510 via other gateway satellites (e.g., first gateway satellite 505) or commercial communication satellites (e.g., using WAN routing or public IPv4 or IPv6 addresses). For example, second gateway satellite 510 may determine that a communication is directed to another gateway satellite and may translate a source address included in the communication based on the WAN address of second gateway satellite 510 and a particular port (e.g., associated with an auxiliary satellite of cluster 555). Additionally or alternatively, second gateway satellite 510 may translate communications received with a destination address matching the WAN address of the second gateway satellite 510 to auxiliary satellites of the cluster 555 based on their respective port addresses. Second gateway satellite 510 may perform static or dynamic NAT, and may push updates for routing tables of neighboring hops on the WAN (e.g., other gateway satellites, commercial communication satellites).

At arrow 640, second gateway satellite 510 may relay the communication to fourth auxiliary satellite 530 via fourth GW/TDL communication link 585 based on determining that fourth auxiliary satellite 530 is the intended destination of the communication—e.g., based on the received address and/or a routing table stored at second gateway satellite 510. In some cases, relaying data extracted from the communication to first auxiliary satellite includes packaging, encrypting, and/or transmitting the communication in accordance with a GW/TDL communication protocol. In other cases, second gateway satellite 510 relays the communication without extracting the data by encapsulating a request included in the communication in a data packet that is composed according to the GW/TDL communication protocol. In other cases, second gateway satellite 510 relays the communication without extracting the data by relaying the communication using the third TDL communication protocol used by fourth auxiliary satellite 530.

At arrow 645, fourth auxiliary satellite 530 may transmit, to second gateway satellite 510, a response to a request included in the communication via fourth GW/TDL communication link 585. In some cases, the response may include data acquired using a functionality provided by fourth auxiliary satellite 530. For example, fourth auxiliary satellite 530 may be configured to obtain satellite imaging and may transmit a response including an image of a particular location based on decoding a request asking for an image of the particular location. Fourth auxiliary satellite 530 may transmit the response using either a GW/TDL communication protocol or a third TDL communication protocol.

At block 650, second gateway satellite 510 may determine a destination node for the response as similarly described with reference to block 635. At arrow 655, second gateway satellite 510 may relay the response to first gateway satellite 505 as similarly described with reference to arrow 630.

At block 660, first gateway satellite 505 may determine a destination node for the response as similarly described with reference to block 625. In some cases, first gateway satellite 505 may determine that first auxiliary satellite 515 is the destination node.

At arrow 665, first gateway satellite 505 may relay the response generated by fourth auxiliary satellite 530 to first auxiliary satellite 515 via first GW/TDL communication link 570—e.g., using either a GW/TDL or a first TDL communication protocol.

At arrow 670, first auxiliary satellite 515 may relay the response to first user device 535 via first TDL communication link 595—e.g., using the first TDL communication protocol. After receiving the response, first user device 535 may decode the data packet. Thus, first user device 535 may access a functionality of an auxiliary satellite that uses a different TDL communication protocol and is out of communication range of first user device 535. In some cases, first user device 535 may obtain imaging from fourth auxiliary satellite 530 that reflects imaging that is beyond the line of sight of an auxiliary satellite included in first cluster 550.

Figure 7:
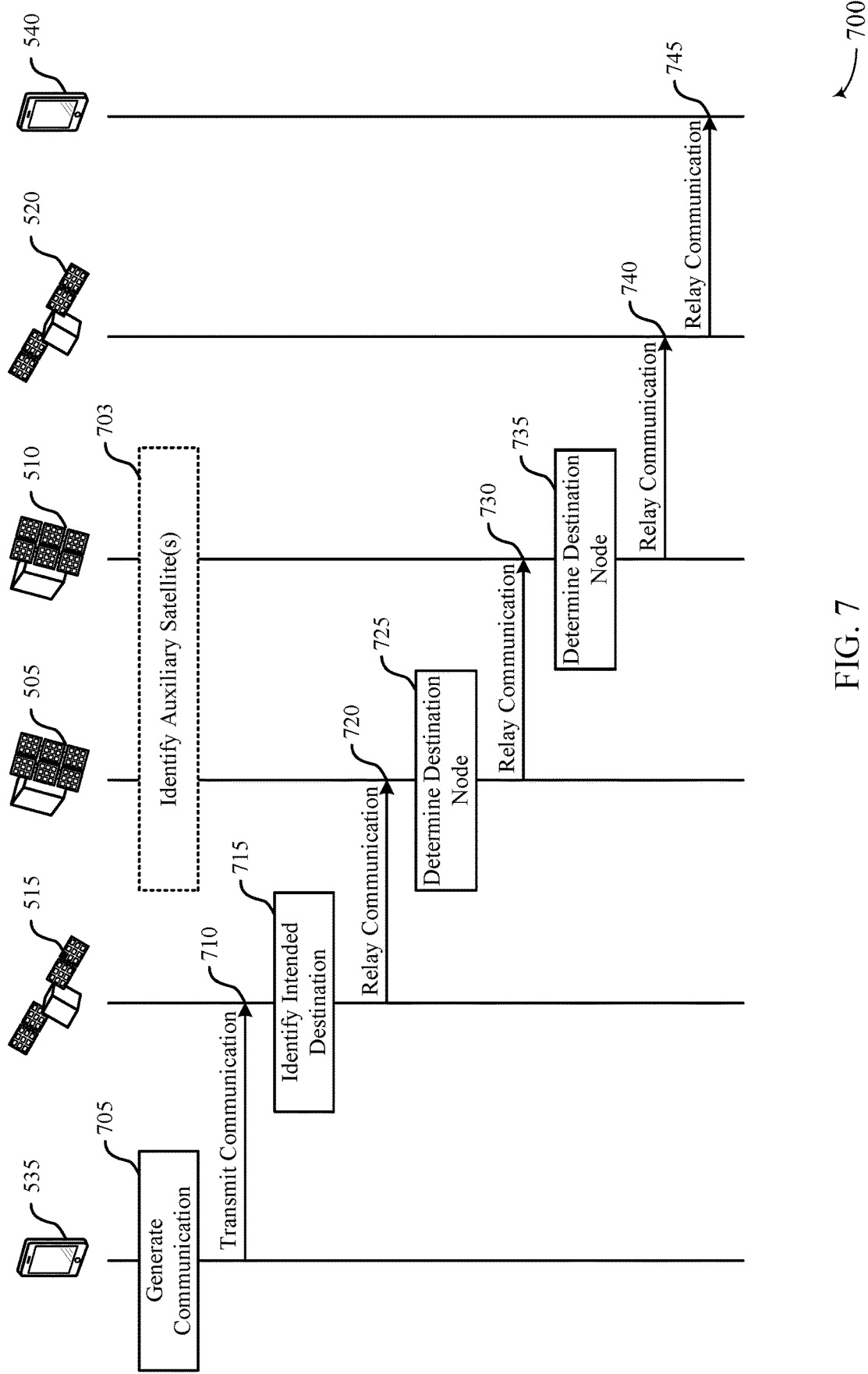

FIG. 7 illustrates aspects of a process flow 700 that supports and utilizes a fractionated satellite constellation as disclosed herein. Process flow 700 may be performed by first gateway satellite 505, second gateway satellite 510, first auxiliary satellite 515, second auxiliary satellite 520, first user device 535, and second user device 540 described with reference to FIG. 5. In some examples, process flow 700 illustrates aspects of a process that enables a user device to perform extended range communications when an auxiliary satellite connected to the user device is unable to reach a user device that is outside a current coverage area of the auxiliary satellite.

At block 703, first gateway satellite 505 and second gateway satellite 510 may identify one or more auxiliary satellites as similarly described with reference to block 603 of FIG. 6.

At block 705, first user device 535 may generate a communication. In some cases, the communication may include a message (e.g., a voice or data message) for second user device 540. As discussed above, first user device 535 may be unable to communicate directly with second user device 540—e.g., because second user device 540 is outside a communication range of first user device 535.

At arrow 710, first user device 535 may transmit the communication to first auxiliary satellite 515 via first TDL communication link 595 as similarly described with reference to arrow 610 of FIG. 6. At block 715, first auxiliary satellite 515 may identify an intended destination of the communication as similarly described with reference to block 615 of FIG. 6. At arrow 720, first auxiliary satellite 515 may relay the communication to first gateway satellite 505 via first GW/TDL communication link 570 as similarly described with reference to arrow 620 of FIG. 6. At block 725, first gateway satellite 505 may determine a destination node for the communication as similarly described with reference to block 625 of FIG. 6. At arrow 730, first gateway satellite 505 may relay the communication to second gateway satellite 510 via GW/GW communication link 590 as similarly described with reference to arrow 630 of FIG. 6. At block 735, second gateway satellite 510 may determine a destination node for the communication as similarly described with reference to block 635 of FIG. 6. At arrow 740, second gateway satellite 510 may relay the communication to second auxiliary satellite 520 via second GW/TDL communication link 575 as similarly described with reference to arrow 640 of FIG. 6.

At arrow 745, second auxiliary satellite 520 may relay the communication to second user device 540 via second TDL communication link 597. In some cases, second auxiliary satellite 520 relays the communication to second user device 540 using the first TDL communication protocol used by first user device 535. Thus, first user device 535 may communicate with another user device that is located in a different coverage area than the first user device 535. In some cases, second user device 540 may similarly transmit messages (e.g., a response) to first user device 535.

Figure 8:
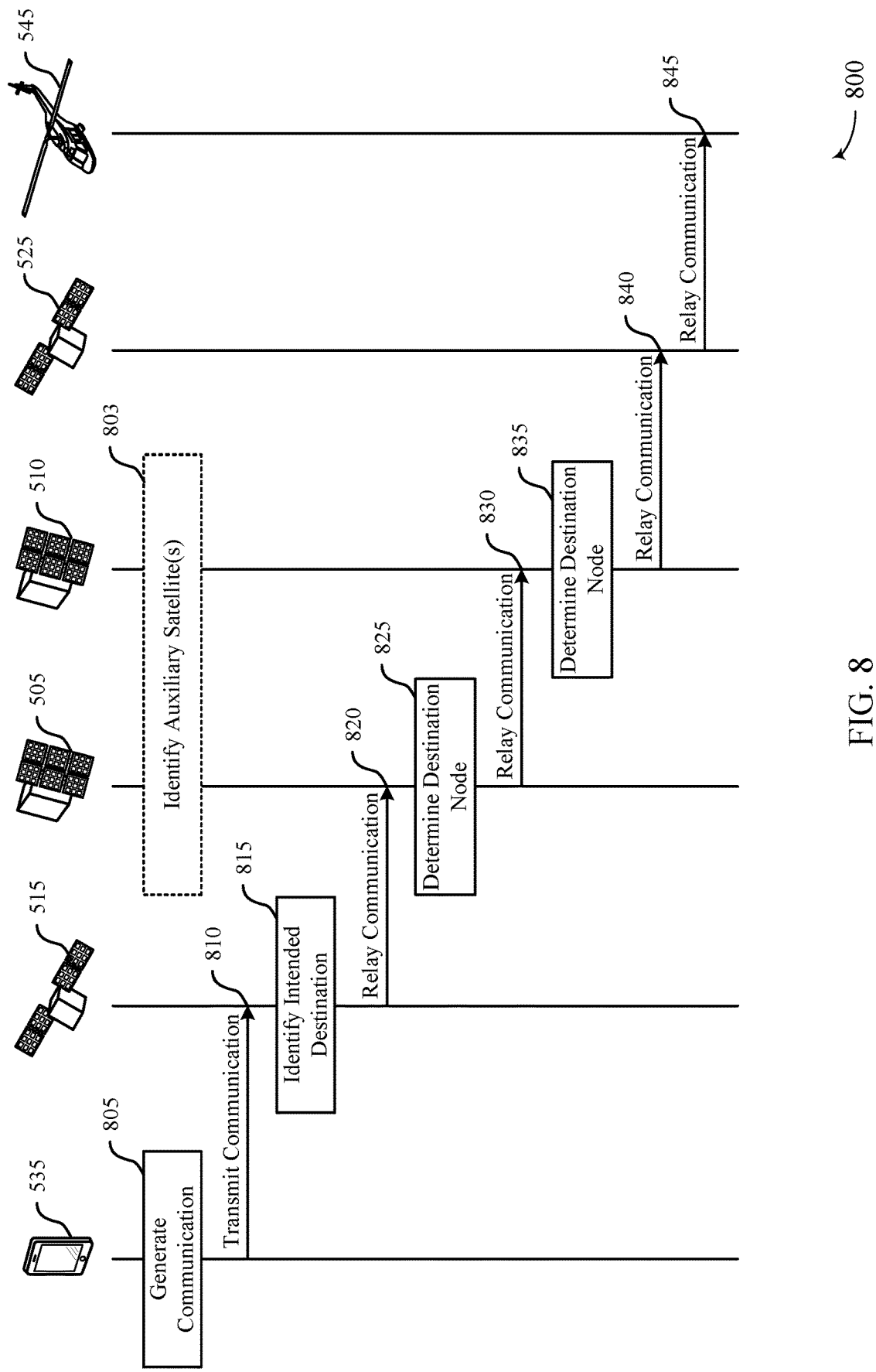

FIG. 8 illustrates aspects of a process flow 800 that supports and utilizes a fractionated satellite constellation as disclosed herein. Process flow 800 may be performed by first gateway satellite 505, second gateway satellite 510, first auxiliary satellite 515, third auxiliary satellite 525, first user device 535, and third user device 545 described with reference to FIG. 5. In some examples, process flow 800 illustrates aspects of a process that enables a user device to perform extended range communications when an auxiliary satellite connected to the user device is unable to reach a user device that is outside a current coverage area of the auxiliary satellite.

At block 803, first gateway satellite 505 and second gateway satellite 510 may identify one or more auxiliary satellites as similarly described with reference to block 603 and block 703 of FIGS. 6 and 7.

At block 805, first user device 535 may generate a communication. In some cases, the communication may include a message (e.g., a voice or data message) for third user device 545. As discussed above, first user device 535 may be unable to communicate directly with third user device 545—e.g., because third user device 545 uses a different communicate protocol than first user device 535 and/or is outside a communication range of first user device 535.

At arrow 810, first user device 535 may transmit the communication to first auxiliary satellite 515 via first TDL communication link 595 as similarly described with reference to arrow 610 and arrow 710 of FIGS. 6 and 7. At block 815, first auxiliary satellite 515 may identify an intended destination of the communication as similarly described with reference to block 615 and block 715 of FIGS. 6 and 7. At arrow 820, first auxiliary satellite 515 may relay the communication to first gateway satellite 505 via first GW/TDL communication link 570 as similarly described with reference to arrow 620 and arrow 720 of FIGS. 6 and 7. At block 825, first gateway satellite 505 may determine a destination node for the communication as similarly described with reference to block 625 and block 725 of FIGS. 6 and 7. At arrow 830, first gateway satellite 505 may relay the communication to second gateway satellite 510 via GW/GW communication link 590 as similarly described with reference to arrow 630 and arrow 730 of FIGS. 6 and 7. At block 835, second gateway satellite 510 may determine a destination node for the communication as similarly described with reference to block 635 and block 735 of FIGS. 6 and 7. At arrow 840, second gateway satellite 510 may relay the communication to third auxiliary satellite 525 via third GW/TDL communication link 580 as similarly described with reference to arrow 640 and arrow 740 of FIGS. 6 and 7.

At arrow 845, third auxiliary satellite 525 may relay the communication to third user device 545 via third TDL communication link 599. In some cases, third auxiliary satellite 525 relays the communication to third user device 545 using the second TDL communication protocol that is different than the first TDL communication protocol used by first user device 535. Thus, first user device 535 may communicate with another user device that uses a different communication protocol and is located in a different coverage area than the first user device 535. In some cases, third user device 545 may similarly transmit messages (e.g., a response) to first user device 535.

Figure 9:
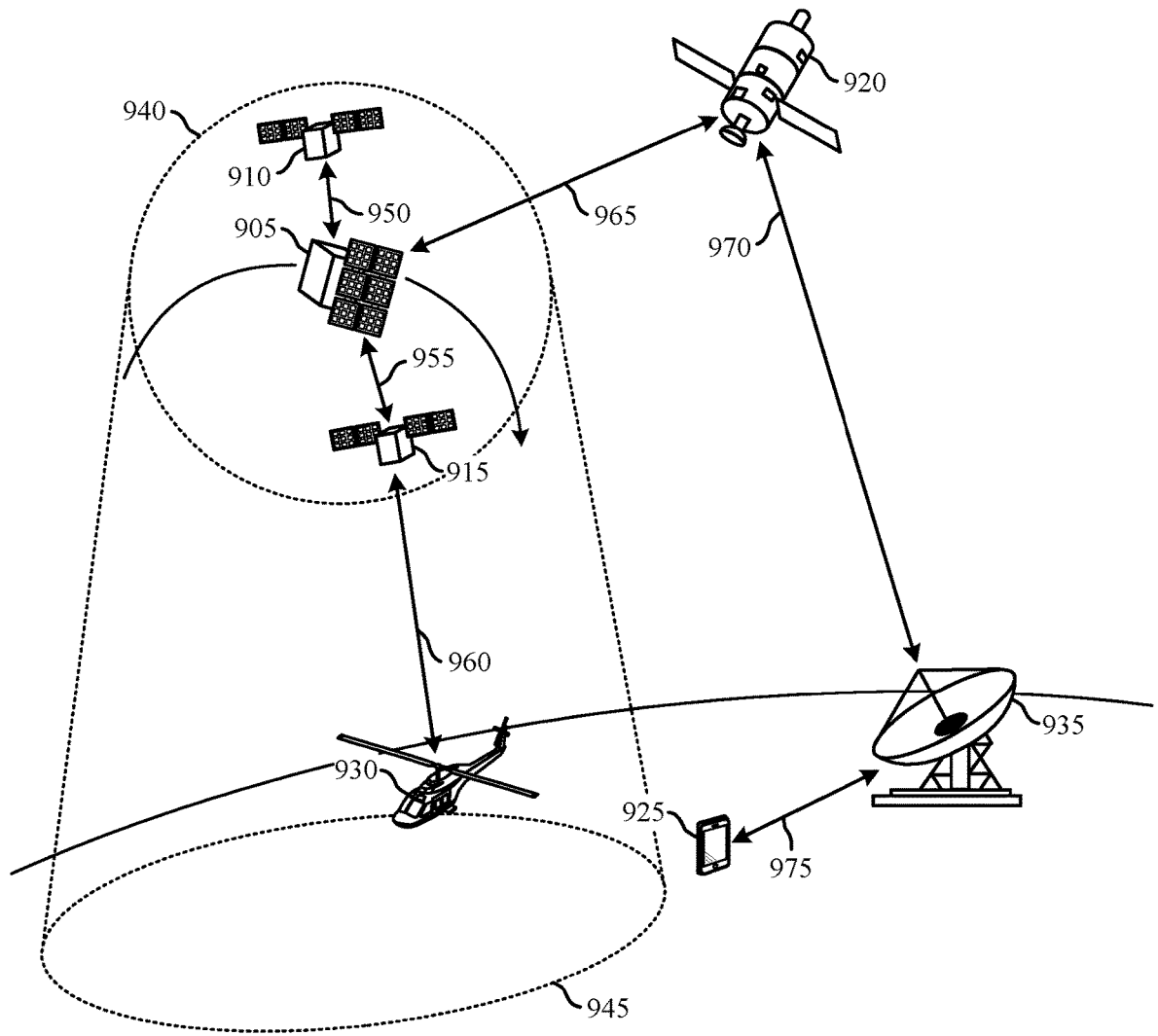
FIG. 9 illustrates aspects of a satellite communications subsystem that supports fractionated satellite constellations as disclosed herein.

FIG. 9 illustrates aspects of a satellite communications subsystem 900 that supports fractionated satellite constellations as disclosed herein. Satellite communications subsystem 900 may include gateway satellite 905, which may be an example of a gateway satellite described with reference to FIGS. 1 through 8. Gateway satellite 905 may be positioned in a LEO.

Satellite communications subsystem 900 may include first auxiliary satellite 910 and second auxiliary satellite 915 which may be examples of auxiliary satellites described with reference to FIG. 1 through 8. First auxiliary satellite 910 and second auxiliary satellite 915 may be orbitally-coupled with gateway satellite 905, as generally described with reference to FIG. 1. Thus, gateway satellite 905, first auxiliary satellite 910, and second auxiliary satellite 915 may be arranged within cluster 940 and may communicate with one another using first GW/TDL communication link 950 and second GW/TDL communication link 955, as generally described with reference to FIGS. 1 through 8. In some cases, first auxiliary satellite 910 may be configured for a first TDL communication protocol and second auxiliary satellite 915 may be configured for a second TDL communication protocol. In some cases, gateway satellite 905 may be configured to relay communications between auxiliary satellites and other gateway satellite as generally described with reference to FIGS. 2 through 8.

Satellite communications subsystem 900 may include first user device 925 and second user device 930, which may be examples of user devices described with reference to FIGS. 1 through 8. First user device 925 may be located outside of geographic coverage area 945—though in some cases, first user device 925 may be located inside geographic coverage area. Second user device 930 may be located within geographic coverage area 945 of cluster 940. Second user device 930 may communicate with second auxiliary satellite 915 using TDL communication link 960, as generally described with reference to FIGS. 1 through 8. In some cases, first user device 925 may be configured for a network communication protocol and second user device 930 may be configured for the second TDL communication protocol. In some cases, second user device 930 may communicate with auxiliary satellites within cluster 940 and user devices within geographic coverage area 945, as similarly described with reference to FIGS. 2 through 4. Second user device 930 may also communicate with auxiliary satellites within different clusters and devices within different geographic coverage areas, as similarly described with reference to FIGS. 5 through 8.

Satellite communications subsystem 900 may include commercial satellite 920, which may be an example of a commercial satellite as described with reference to FIG. 1. In some cases, commercial satellite 920 may be positioned in a GEO. Commercial satellite 920 may communicate with gateway satellite 905 using GW/CL communication link 965, as generally described with reference to FIG. 1. Commercial satellite 920 may communicate with commercial gateway 935 using commercial gateway communication link 970, as generally described with reference to FIG. 1.

Satellite communications subsystem 900 may include a commercial gateway 935, which may be an example of a commercial gateway as described with reference to FIG. 1. Commercial gateway 935 may communicate with first user device 925 using network communication link 975, as generally described with reference to FIG. 1. In some cases, commercial gateway 935 communicates with first user device 925 via an intermediary device, such as a network server.

As discussed above and herein, an auxiliary satellite may not be configured with a connection to a commercial information network. Thus, a user device may be unable to access a commercial network through the auxiliary satellites.

To connect an auxiliary satellite (e.g., first auxiliary satellite 910 and/or second auxiliary satellite 915) to a commercial information network, a gateway satellite (e.g., gateway satellite 905) may be orbitally-coupled with the auxiliary satellite and may be configured to communicate with a commercial satellite (e.g., commercial satellite 920). The gateway satellite may be configured to route communications between the auxiliary satellite and the commercial satellite—e.g., using protocol translation and waveform normalization techniques.

By orbitally-coupling a gateway satellite that is configured to communicate with a commercial satellite and an auxiliary satellite, any user device (e.g., first user device 925) that is connected to the commercial information network may be able to access a functionality of auxiliary satellites that are otherwise inaccessible to the user device—e.g., due to communication protocol incompatibilities and/or connectivity failures. Exemplary communications utilizing a gateway satellite to provide additional functionalities and to connect otherwise incompatible user devices through a commercial information network are discussed in more detail herein and with respect to FIGS. 10 and 11.

Figure 10:
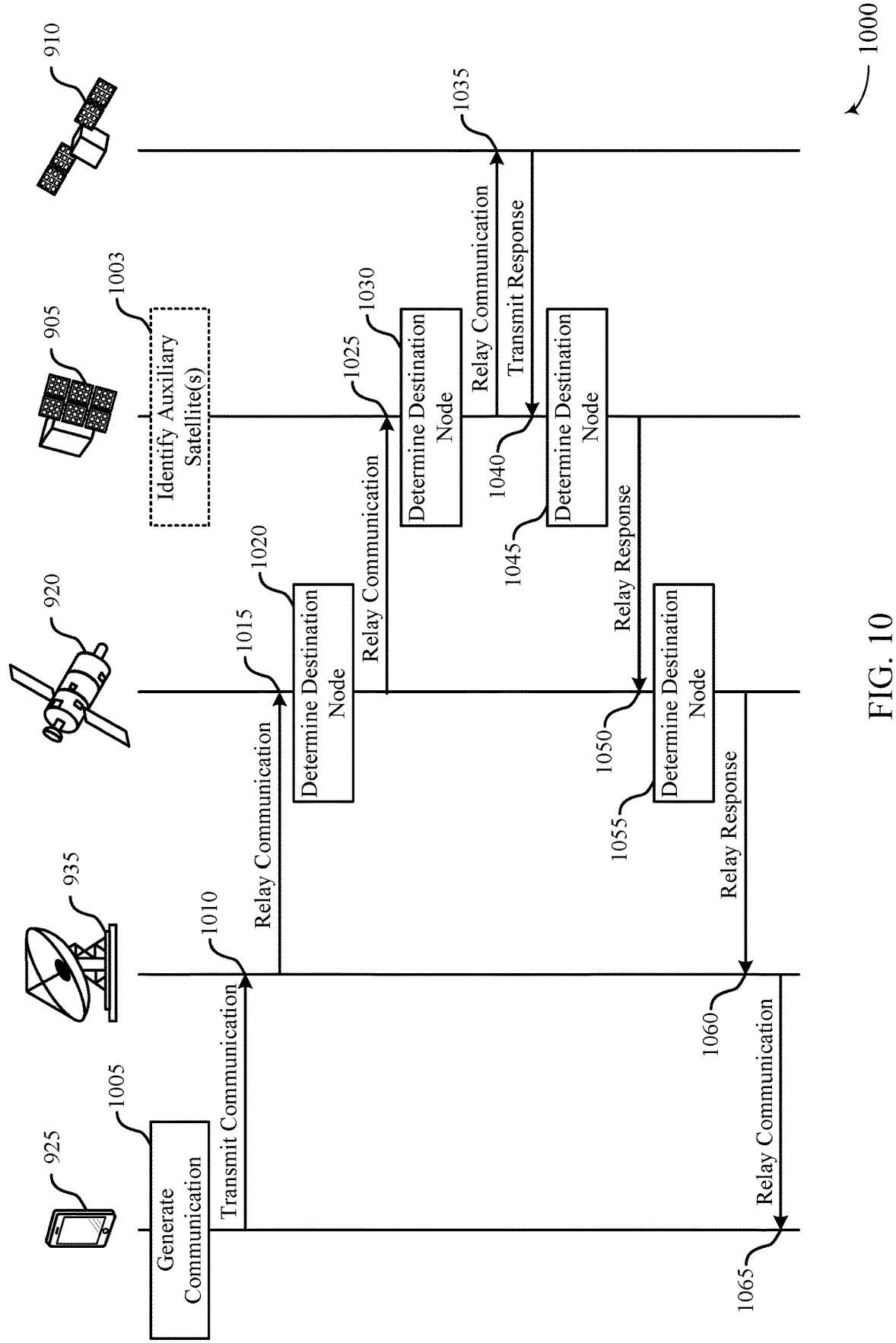
FIGS. 10 and 11 illustrates aspects of processes that support and utilize a fractionated satellite constellation as disclosed herein.

FIG. 10 illustrates aspects of a process flow 1000 that supports and utilizes a fractionated satellite constellation as disclosed herein. Process flow 1000 may be performed by gateway satellite 905, first auxiliary satellite 910, commercial satellite 920, first user device 925, and commercial gateway 935 as described with reference to FIG. 9. In some examples, process flow 1000 illustrates aspects of a process that enables a user device to access a functionality of an auxiliary satellite using a network communication protocol, where auxiliary satellite may not be configured for the network communication protocol and the user device may be located within or outside a communication range of the auxiliary satellite.

At block 1003, gateway satellite 905 may identify one or more auxiliary satellites (including first auxiliary satellite 910) that are orbitally-coupled with gateway satellite 905. In some cases, gateway satellite 905 discovers the one or more auxiliary satellites based on broadcasting discovery messages and receiving response messages. In some examples, the discovery and response messages are transmitted in accordance with a gateway communication protocol. After identifying an auxiliary satellite, gateway satellite 905 may establish a connection with the auxiliary satellite.

At block 1005, first user device 925 may generate a communication. In some cases, the communication may include a request to obtain information associated with a functionality provided by first auxiliary satellite 910. As discussed above, first user device 925 may be unable to communicate directly with first auxiliary satellite 910—e.g., due to communication protocol incompatibilities and/or transmission failures.

At arrow 1010, first user device 925 may transmit the communication to commercial gateway 935 via network communication link 975—e.g., using a network communication protocol. In some cases, first user device 925 transmits the communication to commercial gateway 935 via an intermediary commercial server that is configured to route communications form personal devices to commercial gateway 935. In other cases, first user device 925 may transmit the communication directly to commercial gateway 935. Transmitting the communication using the network communication protocol may include encrypting a request included in the communication, packaging the encrypted request into a data packet, and transmitting the data packet as a waveform in accordance with the network communication protocol.

At arrow 1015, commercial gateway 935 may relay the communication to commercial satellite 920 via commercial gateway communication link 970. In some cases, transmitting the communication may include encapsulating a data packet in another data packet for communicating with a commercial satellite in accordance with a commercial satellite communication protocol.

At block 1020, commercial satellite 920 may identify an intended destination of the communication. In some cases, determining the intended destination includes decoding a receiver address included in the communication. In some cases, commercial satellite 920 determine a communication path to the intended destination based on a routing table stored at commercial satellite 920. in some cases, the communication path includes one or more intermediary gateway satellites and/or auxiliary satellites.

At arrow 1025, commercial satellite 920 may relay the communication to gateway satellite 905 via GW/CL communication link 965 based on identifying an intended destination of the communication and/or the communication path. In some cases, commercial satellite 920 relays the communication to gateway satellite 905 after determining that the intended destination of the communication is an auxiliary satellite within cluster 940 or a user device within geographic coverage area 945. In some cases, commercial satellite 920 relays the communication to gateway satellite 905 using a commercial network communication protocol configured at commercial satellite 920. In some cases, commercial satellite 920 may relay the communication to all gateway satellites within communication range of the commercial satellite—e.g., if commercial satellite 920 does not determine an intended destination of the communication.

At block 1030, gateway satellite 905 may determine a destination node for the communication. In some cases, determining the destination node includes decrypting data in the communication and/or identifying a receiver address included in the communication. In some cases, gateway satellite 905 may compare a decoded receiver address with a list of addresses for auxiliary satellites that are included in cluster 940 and/or a list of addresses for active user devices that are currently in communication range of cluster 940 (e.g., within geographic coverage area 945). In some examples, gateway satellite 905 may determine that the communication is intended for first auxiliary satellite 910—e.g., based on matching a decoding address with an address stored for first auxiliary satellite 910. In some examples, gateway satellite 905 may include a routing table that indicates a communication path from gateway satellite 905 to an intended auxiliary satellite or user device. In some cases, a communication path includes one or more intermediary satellites.

At arrow 1035, gateway satellite 905 may relay the communication to first auxiliary satellite 910 via first GW/TDL communication link 950 based on determining that first auxiliary satellite 910 is the intended destination of the communication and/or the routing table. In some cases, relaying data extracted from the communication to first auxiliary satellite 910 includes packaging, encrypting, and/or transmitting the communication in accordance with a GW/TDL communication protocol. In other cases, gateway satellite 905 relays the communication without extracting the data by encapsulating a request included in the communication in a data packet that is composed according to the GW/TDL communication protocol. In other cases, gateway satellite 905 relays the communication without extracting the data by relaying the communication using the third TDL communication protocol used by first auxiliary satellite 910. In some cases, gateway satellite 905 may relay the communication to another gateway satellite based on an identified receiver address and the routing table—e.g., based on determining that the destination node is an auxiliary satellite, or user device connected to an auxiliary satellite, that is orbitally-coupled with the other gateway satellite.

At arrow 1040, first auxiliary satellite 910 may transmit, to gateway satellite 905, a response to a request included in the communication via first GW/TDL communication link 950. In some cases, the response may include data acquired using a functionality provided by first auxiliary satellite 910. For example, first auxiliary satellite 910 may be configured to obtain satellite imaging and may transmit a response including an image of a particular location based on decoding a request asking for an image of the particular location. First auxiliary satellite 910 may transmit the response using either a GW/TDL communication protocol or a third TDL communication protocol.

At block 1045, gateway satellite 905 may determine a destination node for the response as similarly described with reference to block 1030. In some cases, gateway satellite 905 may determine that commercial satellite 920 is the destination node.

At arrow 1050, gateway satellite 205 may relay the response received from first auxiliary satellite 910 to commercial satellite 920 via GW/CL communication link 965—e.g., using either a GW/CL or a commercial communication protocol.

At block 1055, commercial satellite 920 may determine a destination node for the response as similarly described with reference to block 1020.

At arrow 1060, commercial satellite 920 may relay the response to commercial gateway 935 via commercial gateway communication link 970.

At arrow 1065, commercial gateway 935 may relay the response to first user device 925 via network communication link 975. In some cases, commercial gateway 935 may transmit the response directly to first user device 925. In other cases, commercial gateway 935 may transmit the response to a commercial server that relays the response to first user device 925. Thus, first user device 925, by being connected to a commercial network, may access a functionality of an auxiliary satellite. Also, first auxiliary satellite 910 may be incorporated into a commercial network despite not being configured to support communication over the commercial network.

Figure 11:
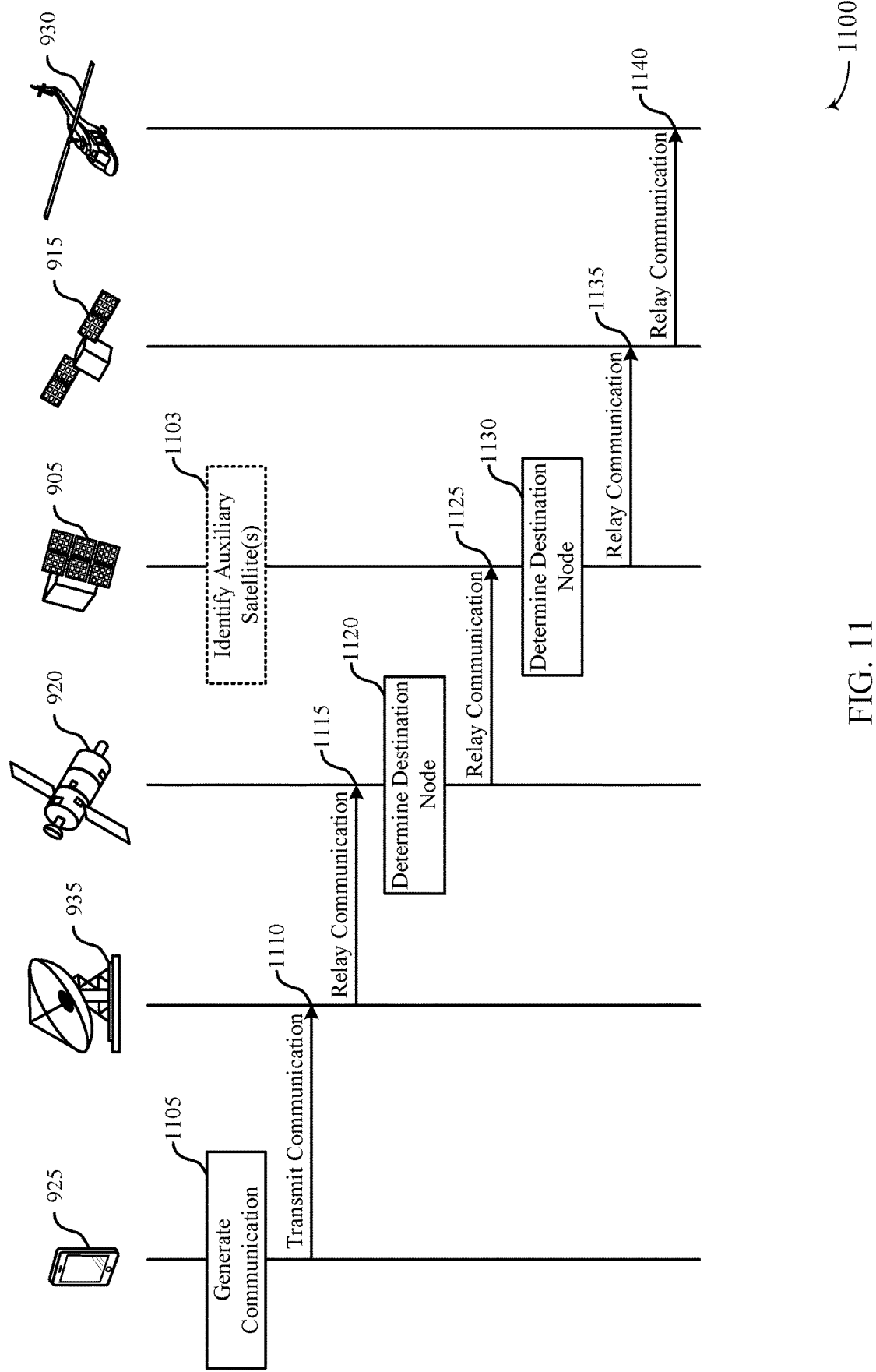

FIG. 11 illustrates aspects of a process flow 1100 that supports and utilizes a fractionated satellite constellation as disclosed herein. Process flow 1100 may be performed by gateway satellite 905, second auxiliary satellite 915, commercial satellite 920, first user device 925, second user device 930, and commercial gateway 935 as described with reference to FIG. 9. In some examples, process flow 1100 illustrates aspects of a process that enables a user device that is connected to a commercial network to perform communications (including extended range communications) with another user device that is not configured to support direct communications with the user device or communication over the commercial network.

At block 1103, gateway satellite 905 may similarly identify one or more auxiliary satellites as similarly described with reference to block 1003 of FIG. 10.

At block 1105, first user device 925 may generate a communication. In some cases, the communication may include a message (e.g., a voice or data message) for second user device 930. As discussed above, first user device 925 may be unable to communicate directly with second user device 930—e.g., because second user device 930 uses a different communication protocol and/or is outside a communication range of first user device 925.

At arrow 1110, first user device 925 may transmit the communication to commercial gateway 935 via network communication link 975, as similarly described with reference to arrow 1010 of FIG. 10. At arrow 1115, commercial gateway 935 may relay the communication to commercial satellite via commercial gateway communication link 970, as similarly described with reference to arrow 1015 of FIG. 10. At block 1120, commercial satellite 920 may identify an intended destination of the communication, as similarly described with reference to block 1020 of FIG. 10. At arrow 1125, commercial satellite 920 may relay the communication to gateway satellite 905 via GW/CL communication link 965, as similarly described with reference to arrow 1025 of FIG. 10. At block 1130, gateway satellite 905 may determine a destination node for the communication, as similarly described with reference to block 1030 of FIG. 10. At arrow 1135, gateway satellite 905 may relay the communication to second auxiliary satellite 915 via second GW/TDL communication link 955, as similarly described with reference to arrow 1035 of FIG. 10.

At arrow 1140, second auxiliary satellite 915 may relay the communication to second user device 930 via TDL communication link 960—e.g., using a second TDL communication protocol. Thus, first user device 925, by being connected to a commercial network, may communicate with another user device that is not configured for the commercial network. In some cases, second user device 930 may similarly transmit messages (e.g., a response) to first user device 925.

Figure 12:
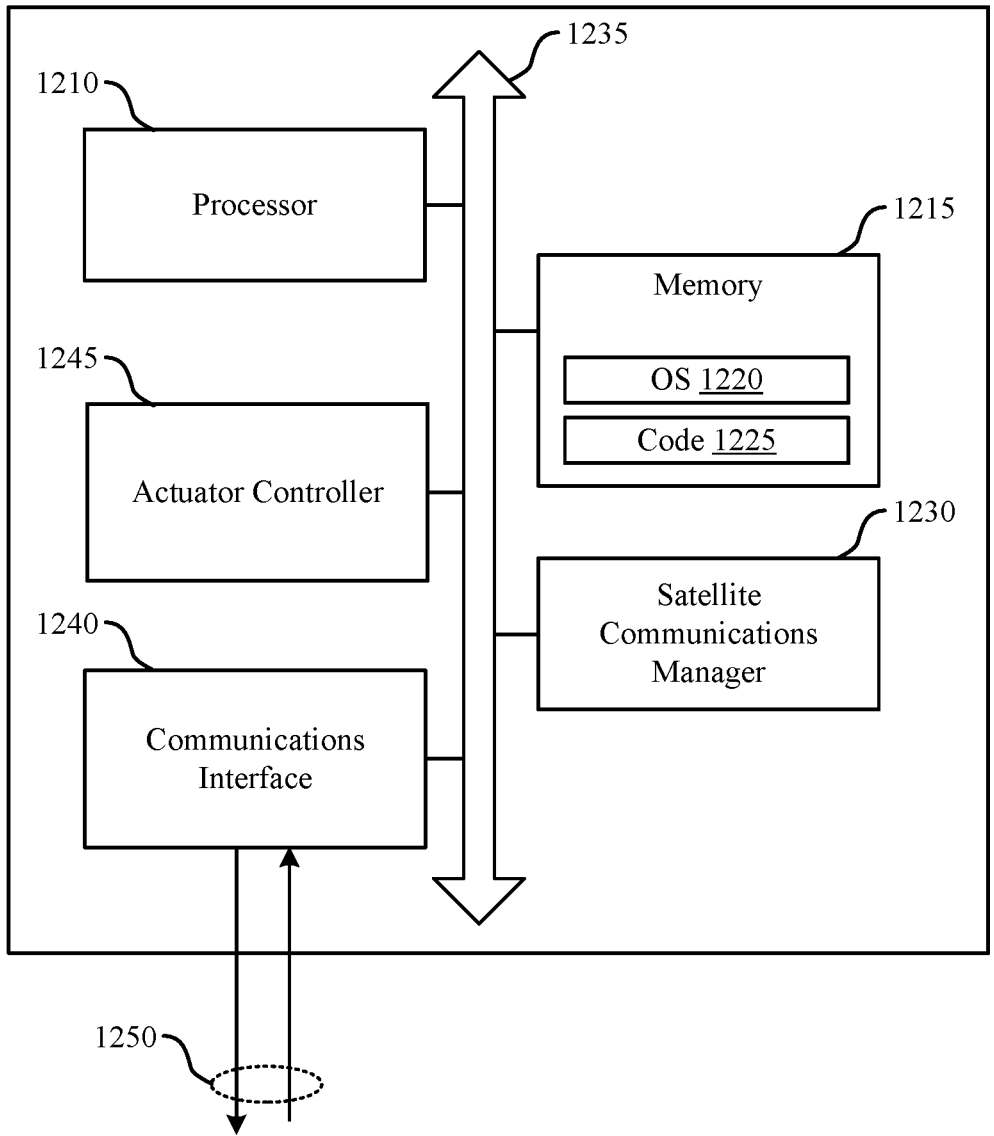
FIG. 12 illustrates a block diagram of a satellite controller that supports fractionated satellite constellations as disclosed herein.

FIG. 12 illustrates a block diagram of a satellite controller 1200 that supports fractionated satellite constellations as disclosed herein. Satellite controller 1200 may be configured to cause a satellite to perform one or more of the processes discussed herein. All or aspects of satellite controller may be implemented in a gateway satellite or an auxiliary satellite. Satellite controller 1200 may include processor 1210, memory 1215, actuator controller 1245, satellite communications manager 1230, and communications interface 1240. Each of these components may be in communication with each other, directly or indirectly, over one or more buses (such as bus 1235).

Memory 1215 may include random access memory (RAM) and/or read-only memory (ROM). Memory 1215 may store an operating system (OS) 1220 (e.g., built on a Linux or Windows kernel). Memory 1215 may also store computer-readable, computer-executable code 1225 including instructions that are configured to, when executed, cause processor 1210 to perform various functions described herein related providing a communications service according to different native antenna patterns. Alternatively, code 1225 may not be directly executable by processor 1210 but may be configured to cause satellite controller 1205 (e.g., when compiled and executed) to perform one or more of the functions described herein.

Actuator controller 1245 may be configured to control one or more actuators of a satellite that are used to change a position and/or orientation of a satellite or communication antennas of the satellite. Actuator controller 1245 may generate various control signals that are delivered to one or more actuators in response to pre-programmed instructions (e.g., operational configurations, control algorithms, controller gains, offsets, deadbands, multipliers, etc.) and/or received signals.

Communications interface 1240 may be configured to support communications between multiple types of satellites using multiple communication protocols. Communications interface 1240 may be configured to transmit and receive signals 1250. In some cases, communications interface 1240 may include one or more radio frequency (RF) chains for receiving communications from one or more satellites. In some examples, communications interface is configured with a radio and a gateway communication protocol for communications between a gateway satellite and an auxiliary satellite. In some examples, communications interface is configured with a radio and a gateway communication protocol for communications between a gateway satellite and a commercial satellite. In some examples, communications interface is configured with a radio and a gateway communication protocol for communications between a gateway satellite and another gateway satellite. In some examples, communications interface is configured with a radio and a TDL communication protocol for communications between an auxiliary satellite and a user device.

Satellite communications manager 1230 may be configured to relay and/or route communications between satellites. In some cases, satellite communications manager 1230 may be configured to determine a destination node for a communication. In some examples, satellite communications manager 1230 may be configured to relay a communication to a gateway satellite after determining that the communication is directed to another satellite. In some examples, satellite communications manager 1230 may be configured to route a communication between auxiliary satellites. In some cases, routing the communication between auxiliary satellites may include relaying the communication to other gateway satellites.

Satellite controller 1200, including processor 1210, memory 1215, actuator controller 1245, satellite communications manager 1230, and/or communications interface 1240 may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. Satellite controller 1200 may also be implemented as a combination of computing devices, e.g., a combination of a DSP and a microprocessor, multiple microprocessors, one or more microprocessors in conjunction with a DSP core, integrated memory, discrete memory, or any other such configuration.

Figure 13:
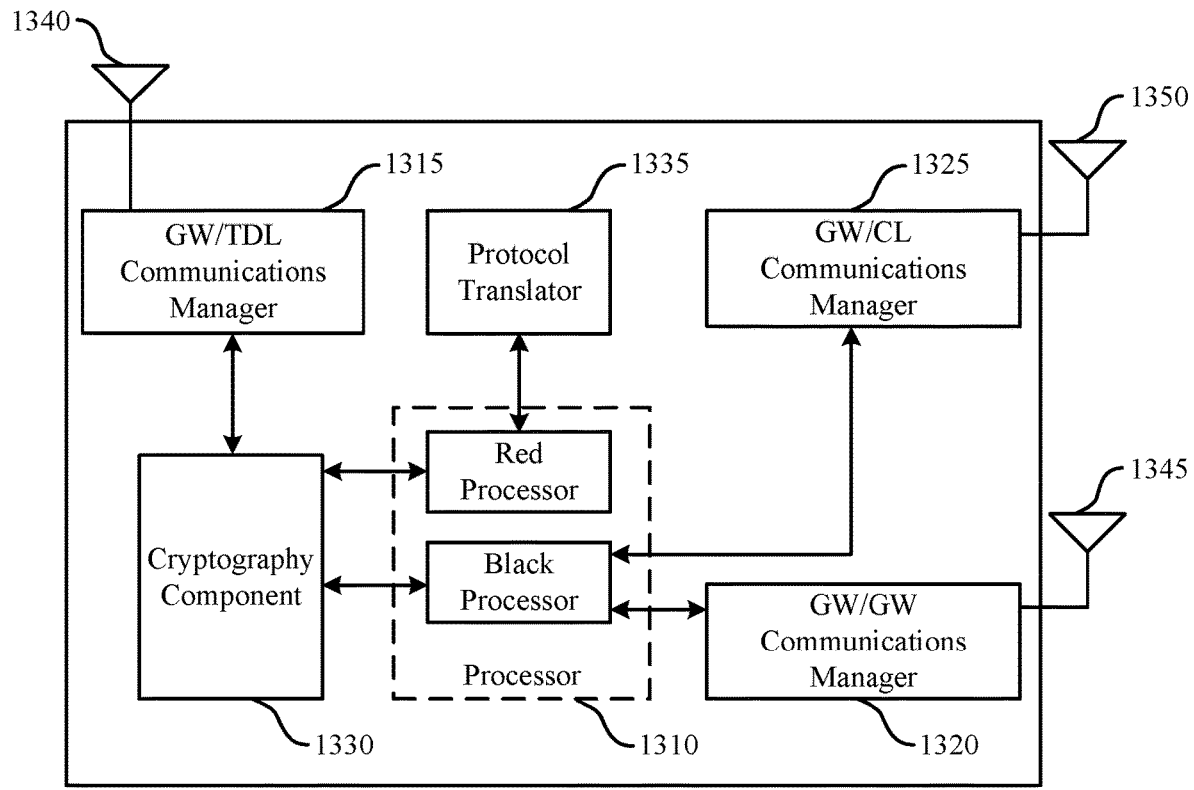
FIG. 13 illustrates a block diagram of an exemplary gateway satellite that supports fractionated satellite constellations as disclosed herein.

FIG. 13 illustrates a block diagram of an exemplary gateway satellite 1300 that supports fractionated satellite constellations as disclosed herein. Gateway satellite 1300 may be configured to route communications to, from, and between auxiliary satellites, other gateway satellites, or commercial communication satellites. Gateway satellite 1300 may include processor 1310, GW/TDL communications manager 1315, GW/GW communications manager 1320, GW/CL communications manager 1325, cryptography component 1330, and protocol translator 1335. Gateway satellite 1300 may also include first antenna 1340, second antenna 1345, and third antenna 1350.

Processor 1310 may be configured to process communications received from or intended for one or more satellites. In some cases, processor 1310 may include a red processor and a black processor. The red processor may be configured to perform cryptographic functions (such as authentication and guard). And the black processor may be configured to perform communications-specific functions (such as packetizing data and determining destination nodes for a communication). In some cases, processor 1310 may be an example of processor 1210 described with reference to FIG. 12.

Cryptography component 1330 may be configured to perform cryptographic functions that are not performed by the red processor (e.g., decryption, encryption, storage and maintenance of cryptographic keys). Protocol translator 1335 may be configured to translate a received communication from one communication protocol (e.g., a first TDL communication protocol used to transmit the communication) to another communication protocol (e.g., a second TDL communication protocol associated with a determined destination node for the communication). In some cases, red processor or cryptography component 1330 may be located in a trusted execution environment of processor 1310. In some cases, cryptography component 1330 and protocol translator 1335 may be included in satellite communications manager 1230 of FIG. 12.

GW/TDL communications manager 1315 may be configured to manage communications received from and transmitted to auxiliary satellites (e.g., over a TDL cross link). In some cases, GW/TDL communications manager 1315 may be configured to support communications that are constructed in accordance with a GW/TDL communication protocol. Additionally or alternatively, GW/TDL communications manager 1315 may be configured to support communications that are constructed in accordance with one or more TDL communications protocols. In some cases, GW/TDL communications manager 1315 may use first antenna 1340 to receive from and transmit communications to auxiliary satellites.

GW/GW communications manager 1320 may be configured to manage communications between gateway satellites (e.g., over a GW/GW cross link). In some cases, GW/GW communications manager 1320 may be configured to support communications that are constructed in accordance with a GW/GW communication protocol. In some cases, GW/GW communications manager 1320 may use second antenna 1345 to receive communications from gateway satellites. In some cases, second antenna 1345 may be configured differently than first antenna 1340. For example, second antenna 1345 may be configured to receive over a different set of frequencies than first antenna 1340.

GW/CL communications manager 1325 may be configured to manage communications between gateway satellites and commercial satellites (e.g., over a GW/CL cross link). In some cases, GW/CL communications manager 1325 may be configured to support communications that are constructed in accordance with a GW/CL communications protocol. Additionally or alternatively, GW/CL communications manager 1325 may also be configured to support communications that are constructed in accordance with a CL communications protocol. In some cases, GW/CL communications manager 1325 may use third antenna 1350 to receive communications from commercial satellites. In some cases, third antenna 1350 may be configured differently than first antenna 1340 and/or second antenna 1345. For example, third antenna 1360 may be configured to receive over a different set of frequencies than first antenna 1340 and/or second antenna 1345.

In some cases, GW/TDL communications manager 1315, GW/GW communications manager 1320, GW/CL communications manager 1325, first antenna 1340, second antenna 1345, and third antenna 1350 may be included in a communications interface, such as communications interface 1240 of FIG. 12.

Figure 14:
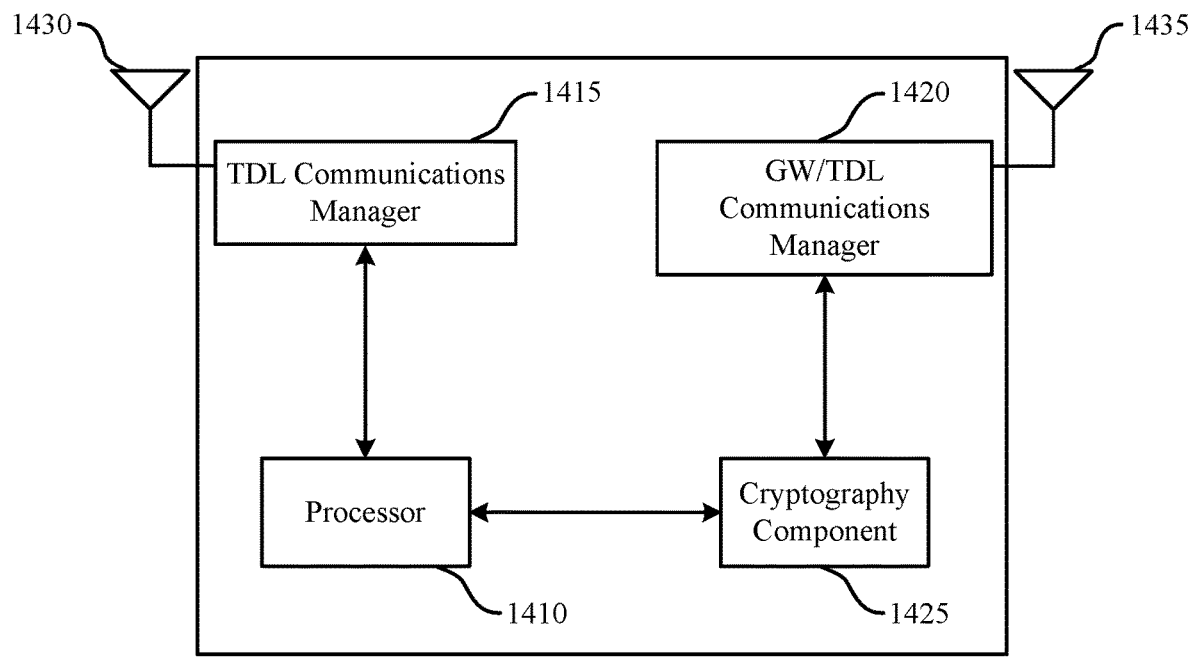
FIG. 14 illustrates a block diagram of an exemplary auxiliary satellite that supports fractionated satellite constellations as disclosed herein.

FIG. 14 illustrates a block diagram of an exemplary auxiliary satellite 1400 that supports fractionated satellite constellations as disclosed herein. Auxiliary satellite 1400 may be configured to provide a user device with a functionality and to use a TDL communication protocol. Auxiliary satellite 1400 may include processor 1410, TDL communications manager 1415, GW/TDL communications manager 1420, cryptography component 1425, first antenna 1430, and second antenna 1435.

Processor 1410 may be configured to process communications received from or intended for a user device. In some cases, processor 1410 may be an example of a processor 1210 described with reference to FIG. 12.

TDL communications manager 1415 may be configured to manage communications received from and transmitted to a user device (e.g., over a TDL communications link). In some cases, TDL communications manager 1415 may be configured to support communications that are constructed in accordance with a TDL communication protocol. TDL communications manager 1415 may provide a received communication to processor 1410. In some cases, TDL communications manager 1415 may use first antenna 1430 to receive from and transmit communications to user devices and/or auxiliary satellites that use a TDL communication protocol configured at auxiliary satellite 1400.

GW/TDL communications manager 1420 may be configured to manage communications received from and transmitted to a gateway satellite (e.g., over a GW/TDL cross link). In some cases, GW/TDL communications manager 1420 may be configured to support communications that are constructed in accordance with a GW/TDL communication protocol. Additionally or alternatively, GW/TDL communications manager 1420 may be configured to support communications that are constructed in accordance with a TDL communication protocol configured at auxiliary satellite 1400. In some cases, GW/TDL communications manager 1420 may use second antenna 1435 to receive from and transmit communications to gateway satellites—e.g., using either a gateway communication protocol or a TDL communication protocol configured at auxiliary satellite 1400. In some cases, second antenna 1435 is configured differently than first antenna 1430—e.g., second antenna 1435 may be configured to receive over a different set of frequencies than first antenna 1430.

In some cases, TDL communications manager 1415 and GW/TDL communications manager 1420, first antenna 1430 and second antenna 1435 may be included in a communications interface, such as communications interface 1240 of FIG. 12.

Cryptography component 1425 may be configured to perform cryptographic functions (including decryption, encryption, authentication, and guard). In some cases, cryptography component 1425 may be included in satellite communications manager 1230 of FIG. 12.

Figure 15:
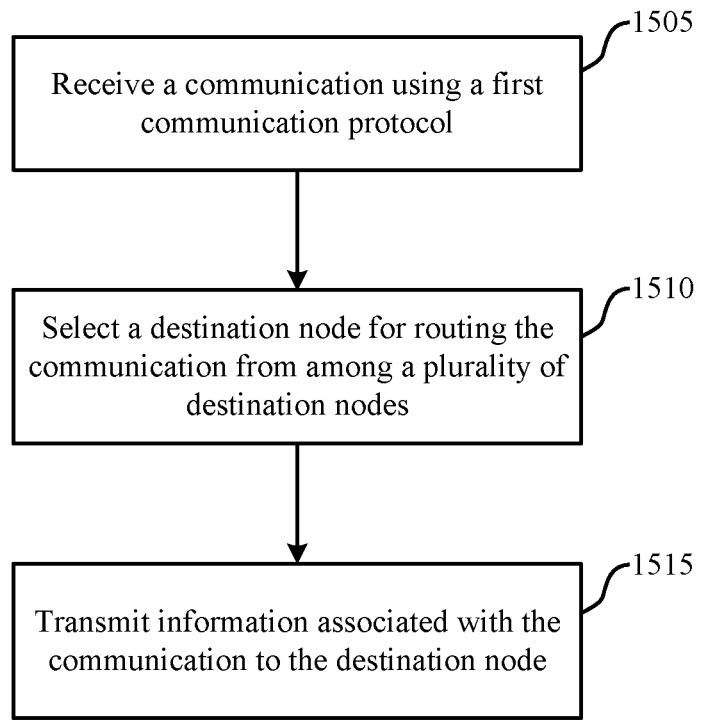
FIGS. 15 and 16 shows a flowcharts illustrating methods that support recovering from a master node link failure as disclosed herein.

FIG. 15 shows a flowchart illustrating a method 1500 that supports fractionated satellite constellations in accordance with aspects of the present disclosure. The operations of method 1500 may be implemented by a gateway satellite or its components as described herein. For example, the operations of method 1500 may be performed by a gateway satellite as described with reference to FIGS. 12 and 13. Additionally or alternatively, a gateway satellite may perform aspects of the functions described below using special-purpose hardware.

At 1505, the gateway satellite may receive, from a first auxiliary satellite that is orbitally-coupled with the first gateway satellite and providing a first functionality, a communication using the first communication protocol. The operations of 1505 may be performed according to the methods described herein. In some examples, aspects of operations of 1505 may be performed by a GW/TDL communications manager, as described with reference to FIG. 13.

At 1510, the gateway satellite may select a destination node for routing the communication from among a plurality of destination nodes, the plurality of destination nodes comprising a second auxiliary satellite that is orbitally-coupled with the first gateway satellite and providing a second functionality, a second gateway satellite having a second orbit, and a commercial communications satellite having a third orbit. The operations of 1510 may be performed according to the methods described herein. In some examples, aspects of operations of 1510 may be performed by a processor 1310, as described with reference to FIG. 13.

At 1515, the gateway satellite may transmit information associated with the communication to the destination node. The operations of 1515 may be performed according to the methods described herein. In some examples, aspects of operations of 1515 may be performed by a GW/TDL communications manager, a GW/GW communications manager, and/or a GW/CL communications manager, as described with reference to FIG. 13.

Figure 16:
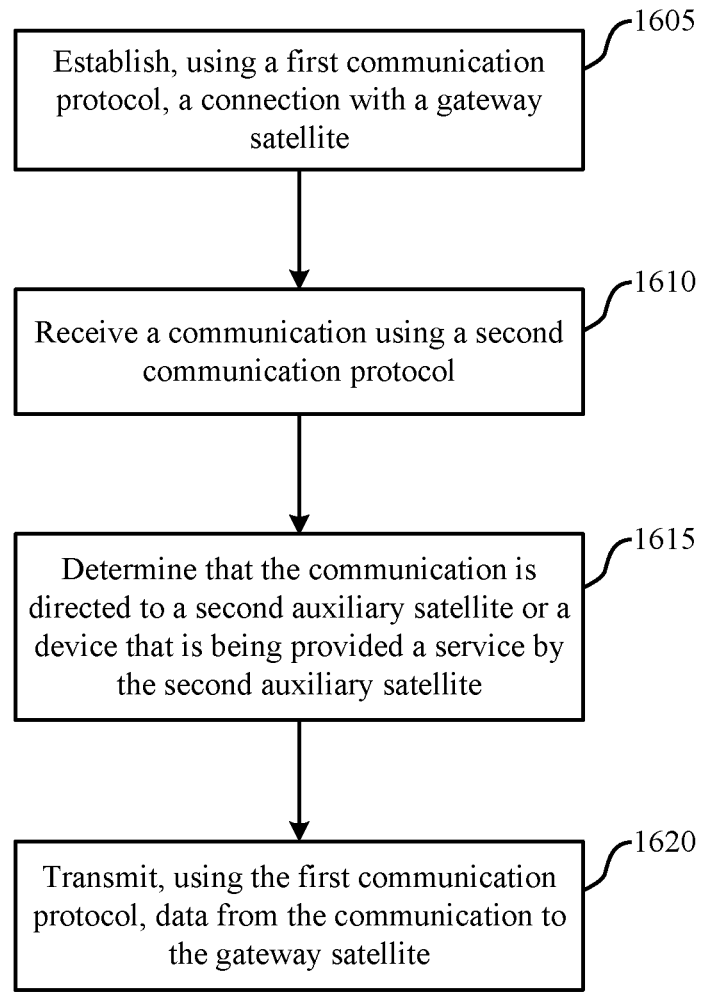

FIG. 16 shows a flowchart illustrating a method 1600 that supports fractionated satellite constellations in accordance with aspects of the present disclosure. The operations of method 1600 may be implemented by an auxiliary satellite or its components as described herein. For example, the operations of method 1600 may be performed by an auxiliary satellite as described with reference to FIGS. 12 and 14. Additionally or alternatively, an auxiliary satellite may perform aspects of the functions described below using special-purpose hardware.

At 1605, the auxiliary satellite may establish, using a first communication protocol, a connection with a gateway satellite, wherein the first auxiliary satellite is orbitally-coupled with the gateway satellite. The operations of 1605 may be performed according to the methods described herein. In some examples, aspects of operations of 1605 may be performed by a GW/TDL communications manager, as described with reference to FIG. 14.

At 1610, the auxiliary satellite may receive a communication using a second communication protocol. The operations of 1610 may be performed according to the methods described herein. In some examples, aspects of operations of 1610 may be performed by a TDL communications manager, as described with reference to FIG. 14.

At 1615, the auxiliary satellite may determine that the communication is directed to a second auxiliary satellite or a device that is being provided a service by the second auxiliary satellite. The operations of 1615 may be performed according to the methods described herein. In some examples, aspects of operations of 1615 may be performed by a processor, as described with reference to FIG. 14.

At 1620, the auxiliary satellite may transmit, using the first communication protocol, data from the communication to the gateway satellite based at least in part on the determining, the gateway satellite configured to route the communication directly to the second auxiliary satellite or to route the communication indirectly to the second auxiliary satellite via a second gateway satellite having a second orbit. The operations of 1620 may be performed according to the methods described herein. In some examples, aspects of operations of 1620 may be performed by a GW/TDL communications manager, as described with reference to FIG. 14.

It should be noted that the methods described herein describe possible implementations, and that the operations and the steps may be rearranged or otherwise modified and that other implementations are possible. Further, aspects from two or more of the methods may be combined.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical positions. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The invention claimed is:

1. A system, comprising:
a first auxiliary satellite configured to communicate in accordance with a first packetization scheme, a first cryptography scheme, a first coding scheme, or a combination thereof;
a second auxiliary satellite configured to communicate in accordance with a second packetization scheme, a second cryptography scheme, a second coding scheme, or a combination thereof; and
a gateway satellite configured to communicate with the first auxiliary satellite via a first communication link and to communicate with the second auxiliary satellite via a second communication link, wherein the gateway satellite is configured to translate between one or more of the first packetization scheme, the first cryptography scheme, or the first coding scheme and one or more of the second packetization scheme, the second cryptography scheme, or the second coding scheme for routing communications between the first auxiliary satellite and the second auxiliary satellite.

2. The system of claim 1, wherein:
the first auxiliary satellite is configured to communicate payloads of a first payload type over the first communication link using a first communication protocol; and
the second auxiliary satellite is configured to communicate payloads of a second payload type that is different than the first payload type over the second communication link using a second communication protocol.

3. The system of claim 2, wherein the second payload type is associated with information collected from a first sensor type, and wherein the second auxiliary satellite is configured to communicate the information with the gateway satellite using the second communication protocol.

4. The system of claim 1, wherein:
the first auxiliary satellite is configured to communicate with the gateway satellite over the first communication link using a first communication protocol;
the second auxiliary satellite is configured to communicate with the gateway satellite over the second communication link using a second communication protocol; and
the gateway satellite is configured to translate between the first communication protocol and the second communication protocol, and route communications between the first auxiliary satellite and the second auxiliary satellite over the first and second communication links using the first communication protocol and the second communication protocol.

5. The system of claim 4, wherein:
the first communication protocol is associated with a first range of frequencies; and
the second communication protocol is associated with a second range of frequencies.

6. The system of claim 4, wherein:
the first communication protocol is associated with the one or more of the first packetization scheme, the first cryptography scheme, or the first coding scheme; and
the second communication protocol is associated with the one or more of the second packetization scheme, the second cryptography scheme, or the second coding scheme.

7. The system of claim 1, wherein the gateway satellite is a first gateway satellite, the system further comprising:
a third auxiliary satellite; and
a second gateway satellite configured to communicate with the third auxiliary satellite via a third communication link, wherein the first gateway satellite is configured to route communications between the first auxiliary satellite and the third auxiliary satellite through the second gateway satellite via the third communication link.

8. The system of claim 1, wherein the gateway satellite is configured to provide a third communication link for routing communications between the first auxiliary satellite and a commercial communications satellite.

9. The system of claim 1, wherein the gateway satellite comprises an omnidirectional antenna, and wherein the gateway satellite is configured to communicate with the first auxiliary satellite and the second auxiliary satellite via the omnidirectional antenna.

10. A method performed at a gateway satellite, the method comprising:
- receiving, from a first auxiliary satellite over a first communication link, a communication, wherein the communication is received from the first auxiliary satellite in accordance with a first packetization scheme, a first cryptography scheme, a first coding scheme, or a combination thereof;
- determining a second auxiliary satellite for routing the communication to, based at least in part on receiving the communication from the first auxiliary satellite;
- translating the received communication between one or more of the first packetization scheme, the first cryptography scheme, or the first coding scheme and one or more of a second packetization scheme, a second cryptography scheme, or a second coding scheme associated with the second auxiliary satellite; and
- routing the translated communication to the second auxiliary satellite over a second communication link in accordance with the one or more of the second packetization scheme, the second cryptography scheme, or the second coding scheme.

11. The method of claim 10, wherein the communication comprises a data packet that conforms to a first communication protocol, the method further comprising:
- translating data from the data packet from the first communication protocol to a second communication protocol used by the second auxiliary satellite,
- wherein determining the second auxiliary satellite is based at least in part on translating the data.

12. The method of claim 10, further comprising:
- determining that a request to access a payload type is included in the communication,
- wherein the second auxiliary satellite is determined based at least in part on the requested payload type.

13. The method of claim 10, further comprising:
- receiving, from the second auxiliary satellite, a second communication, wherein receiving the second communication from the second auxiliary satellite is based at least in part on transmitting the translated communication to the second auxiliary satellite.

14. The method of claim 10, further comprising:
- determining a second gateway satellite based at least in part on receiving the communication from the first auxiliary satellite, wherein routing the translated communication to the second auxiliary satellite comprises routing the translated communication to the second auxiliary satellite via the second gateway satellite.

15. The method of claim 14, further comprising:
- receiving, from the second gateway satellite, a second communication;
- determining that the second communication is directed to the first auxiliary satellite based at least in part on receiving the second communication from the second gateway satellite; and
- routing the second communication to the first auxiliary satellite based at least in part on determining that the second communication is directed to the first auxiliary satellite.

16. The method of claim 10, further comprising:
- determining that the communication is directed to a device that is being provided a communication service by the second auxiliary satellite based at least in part on receiving the communication,
- wherein determining the second auxiliary satellite is based at least in part on determining that the communication is directed to the device that is being provided the communication service by the second auxiliary satellite.

17. The method of claim 10, further comprising:
- receiving, from a commercial communications satellite, a second communication;
- determining that the communication is directed to the second auxiliary satellite based at least in part on receiving the second communication; and
- routing the second communication to the second auxiliary satellite based at least in part on determining that the communication is directed to the second auxiliary satellite.

18. A method performed at a first auxiliary satellite that provides a communications service, the method comprising:
- establishing a communication link with a gateway satellite, wherein the first auxiliary satellite is configured to communicate in accordance with a first packetization scheme, a first cryptography scheme, a first coding scheme, or a combination thereof;
- receiving a communication directed to a second auxiliary satellite or a device that is being provided a service by the second auxiliary satellite, wherein the second auxiliary satellite is configured to communicate in accordance with a second packetization scheme, a second cryptography scheme, a second coding scheme, or a combination thereof; and
- transmitting data from the communication to the gateway satellite over the communication link in accordance with one or more of the first packetization scheme, the first cryptography scheme, or the first coding scheme, for routing the data to the second auxiliary satellite, wherein the gateway satellite is configured to communicate the data to the second auxiliary satellite according to one or more of the second packetization scheme, the second cryptography scheme, or the second coding scheme.

19. The method of claim 18, further comprising:
- determining that the communication is directed to the second auxiliary satellite or the device that is being provided the service by the second auxiliary satellite, wherein transmitting the data from the communication to the gateway satellite is based at least in part on determining that the communication is directed to the second auxiliary satellite or the device that is being provided the service by the second auxiliary satellite.

20. The method of claim 19, further comprising:
- decoding a portion of the communication,
- wherein determining that the communication is directed to the second auxiliary satellite or the device that is being provided the service by the second auxiliary satellite is based at least in part on the decoded portion of the communication.

21. The method of claim 20, further comprising:
- obtaining a first address associated with the second auxiliary satellite based at least in part on the decoded portion of the communication,
- wherein determining that the communication is directed to the second auxiliary satellite or the device that is being provided the service by the second auxiliary satellite comprises determining the first address is different than a second address associated with the first auxiliary satellite.

22. The method of claim 18, wherein:
the communication link with the gateway satellite is established using a first communication protocol;
the communication is received using a second communication protocol; and
the data from the communication is transmitted to the gateway satellite over the communication link using the first communication protocol.

23. A gateway satellite that provides a communication link, the gateway satellite comprising:
a processor;
memory coupled with the processor; and
instructions stored in the memory and executable by the processor to cause the gateway satellite to:
receive, from a first auxiliary satellite over a first communication link, a communication, wherein the communication is received from the first auxiliary satellite in accordance with a first packetization scheme, a first cryptography scheme, a first coding scheme or a combination thereof;
determine a second auxiliary satellite for routing the communication to, based at least in part on receiving the communication from the first auxiliary satellite;
translate the received communication between one or more of the first packetization scheme, the first cryptography scheme, or the first coding scheme and one or more of a second packetization scheme, a second cryptography scheme, or a second coding scheme associated with the second auxiliary satellite; and
route the translated communication to the second auxiliary satellite over a second communication link in accordance with the one or more of the second packetization scheme, the second cryptography scheme, or the second coding scheme.

24. The gateway satellite of claim 23, wherein the instructions are further executable by the processor to cause the gateway satellite to:
determine that a request to access a payload type is included in the communication, wherein the second auxiliary satellite is determined based at least in part on the requested payload type.

25. The gateway satellite of claim 23, wherein the instructions are further executable by the processor to cause the gateway satellite to:
receive, from the second auxiliary satellite, a second communication, wherein receiving the second communication from the second auxiliary satellite is based at least in part on transmitting the translated communication to the second auxiliary satellite.

26. The gateway satellite of claim 23, wherein the instructions are further executable by the processor to cause the gateway satellite to:
determine a second gateway satellite based at least in part on receiving the communication from the first auxiliary satellite, wherein routing the translated communication to the second auxiliary satellite comprises routing the translated communication to the second auxiliary satellite via the second gateway satellite.

27. The gateway satellite of claim 23, wherein the instructions are further executable by the processor to cause the gateway satellite to:
determine that the communication is directed to a device that is being provided a communication service by the second auxiliary satellite based at least in part on receiving the communication,
wherein determining the second auxiliary satellite is based at least in part on determining that the communication is directed to the device that is being provided the communication service by the second auxiliary satellite.

28. An auxiliary satellite that provides a communications service, the auxiliary satellite comprising:
a processor;
memory coupled with the processor; and
instructions stored in the memory and executable by the processor to cause the auxiliary satellite to:
establish a communication link with a gateway satellite, wherein the auxiliary satellite is configured to communicate in accordance with a first packetization scheme, a first cryptography scheme, a first coding scheme, or a combination thereof;
receive a communication directed to a second auxiliary satellite or a device that is being provided a service by the second auxiliary satellite, wherein the second auxiliary satellite is configured to communicate in accordance with a second packetization scheme, a second cryptography scheme, a second coding scheme, or a combination thereof; and
transmit data from the communication to the gateway satellite over the communication link in accordance with one or more of the first packetization scheme, the first cryptography scheme, or the first coding scheme, for routing the data to the second auxiliary satellite, wherein the gateway satellite is configured to communicate the data with the second auxiliary satellite according to one or more of the second packetization scheme, the second cryptography scheme, or the second coding scheme.

29. The auxiliary satellite of claim 28, wherein the instructions are further executable by the processor to cause the auxiliary satellite to:
determine that the communication is directed to the second auxiliary satellite or the device that is being provided the service by the second auxiliary satellite, wherein transmitting the data from the communication to the gateway satellite is based at least in part on determining that the communication is directed to the second auxiliary satellite or the device that is being provided the service by the second auxiliary satellite.

30. The auxiliary satellite of claim 29, wherein the instructions are further executable by the processor to cause the auxiliary satellite to:
decode a portion of the communication,
wherein determining that the communication is directed to the second auxiliary satellite or the device that is being provided the service by the second auxiliary satellite is based at least in part on the decoded portion of the communication.

31. The auxiliary satellite of claim 30, wherein the instructions are further executable by the processor to cause the auxiliary satellite to:
obtain a first address associated with the second auxiliary satellite based at least in part on the decoded portion of the communication,
wherein determining that the communication is directed to the second auxiliary satellite or the device that is being provided the service by the second auxiliary satellite comprises determining the first address is different than a second address associated with the first auxiliary satellite.

32. The auxiliary satellite of claim 28, wherein:
the communication link with the gateway satellite is established using a first communication protocol;
the communication is received using a second communication protocol; and
the data from the communication is transmitted to the gateway satellite over the communication link using the first communication protocol.

33. A method, comprising:
establishing, by a first auxiliary satellite, a first communication link with a gateway satellite;
receiving, by the first auxiliary satellite, a communication directed to a second auxiliary satellite or a device that is being provided a service by the second auxiliary satellite;
transmitting, by the first auxiliary satellite, data from the communication to the gateway satellite over the first communication link in accordance with a first packetization scheme, a first cryptography scheme, a first coding scheme or a combination thereof;
receiving, by the gateway satellite, the data transmitted by the first auxiliary satellite;
determining, by the gateway satellite, the second auxiliary satellite based at least in part on receiving the communication from the first auxiliary satellite;
translating, by the gateway satellite, the received data between one or more of the first packetization scheme, the first cryptography scheme, or the first coding scheme and one or more of a second packetization scheme, a second cryptography scheme, or a second coding scheme associated with the second auxiliary satellite; and
routing, by the gateway satellite, the translated data to the second auxiliary satellite over a second communication link in accordance with the one or more of the second packetization scheme, the second cryptography scheme, or the second coding scheme.

* * * * *